United States Patent
Heckel et al.

(10) Patent No.: US 8,460,415 B1
(45) Date of Patent: Jun. 11, 2013

(54) FILTER ELEMENT WITH PERCUSSION BAND

(71) Applicant: Barry M. Verdegan, Stoughton, WI (US)

(72) Inventors: Scott P. Heckel, Stoughton, WI (US); Roger L. Zoch, McFarland, WI (US); Kelly Ann Detra, Brooklyn, WI (US); Guillermo Alberto Smith, Fitchburg, WI (US); Matthew T. VandenBush, Madison, WI (US); Pathikrit T. Banerjee, Abu Dhadi (AE); Caryn J. Kindkeppel, Sun Prairie, WI (US)

(73) Assignee: Cummins Filtration IP Inc., Minneapolis, MN (US)

( * ) Notice: Subject to any disclaimer, the term of this patent is extended or adjusted under 35 U.S.C. 154(b) by 0 days.

(21) Appl. No.: 13/743,744

(22) Filed: Jan. 17, 2013

Related U.S. Application Data

(62) Division of application No. 13/571,815, filed on Aug. 10, 2012, now Pat. No. 8,357,218, which is a division of application No. 13/410,369, filed on Mar. 2, 2012, now Pat. No. 8,241,377, which is a division of application No. 12/545,497, filed on Aug. 21, 2009, now Pat. No. 8,128,719.

(51) Int. Cl.
*B01D 46/00* (2006.01)
(52) U.S. Cl.
USPC .................... 55/300; 55/498; 55/502; 55/304
(58) Field of Classification Search
None
See application file for complete search history.

(56) References Cited

U.S. PATENT DOCUMENTS

| | | | |
|---|---|---|---|
| 2,919,765 A * | 1/1960 | Kasten | ........................... 55/419 |
| 5,022,901 A | 6/1991 | Meunier | |
| 5,103,397 A | 4/1992 | Ikemoto et al. | |
| 5,415,677 A | 5/1995 | Ager et al. | |
| 6,136,192 A | 10/2000 | Booth et al. | |
| 6,149,700 A * | 11/2000 | Morgan et al. | ............... 55/385.3 |
| 6,261,334 B1 | 7/2001 | Morgan et al. | |
| 6,358,292 B1 | 3/2002 | Clements | |
| 6,391,076 B1 | 5/2002 | Jaroszczyk et al. | |
| 6,398,832 B2 | 6/2002 | Morgan et al. | |
| 6,641,637 B2 | 11/2003 | Kallsen et al. | |
| 6,702,941 B1 | 3/2004 | Haq et al. | |
| 6,902,598 B2 | 6/2005 | Gunderson et al. | |
| 7,658,777 B2 | 2/2010 | Kopec et al. | |

(Continued)

OTHER PUBLICATIONS

The definition of "ring" as found in Merriam-Webster Dictionary online.www.merriam-webster.com/dictionary/propeller (Jul. 1, 2011).

*Primary Examiner* — Duane Smith
*Assistant Examiner* — Pankti Patel
(74) *Attorney, Agent, or Firm* — Andrus, Sceales, Starke & Sawall, LLP

(57) ABSTRACT

A filter element has a reinforcement band or ring along at least a portion of the perimeter thereof and performing a support function thereat preventing or minimizing damage upon attempted percussive cleaning of the filter element by service personnel striking the perimeter against an impact surface. Alternatively, a failure band or ring is provided along at least a portion of the perimeter and performs a designated failure function to a failure condition thereat upon attempted percussive cleaning, with the failure condition providing at least one of: a) an indication to service personnel that the filter element has been damaged and should not be re-installed; and b) a deformed condition preventing re-installation.

1 Claim, 22 Drawing Sheets

U.S. PATENT DOCUMENTS

| | | |
|---|---|---|
| 7,740,679 B2 | 6/2010 | Ehrenberg |
| 7,828,870 B1 | 11/2010 | Rech et al. |
| 2004/0148913 A2 | 8/2004 | Engel et al. |
| 2004/0216434 A1 | 11/2004 | Gunderson et al. |
| 2005/0044830 A1 | 3/2005 | Dworatzek et al. |
| 2005/0072302 A1 | 4/2005 | Miller et al. |
| 2006/0260285 A1 | 11/2006 | Pfeiffer et al. |
| 2008/0060329 A1 | 3/2008 | Brown et al. |
| 2008/0066435 A1 | 3/2008 | Engel et al. |
| 2008/0209874 A1 | 9/2008 | Gieseke et al. |
| 2008/0245039 A1 | 10/2008 | Anderson et al. |
| 2008/0264007 A1 | 10/2008 | Oh et al. |
| 2008/0276583 A1 | 11/2008 | Munkel |
| 2009/0205302 A1 | 8/2009 | Rieger |
| 2009/0320424 A1 | 12/2009 | Merritt et al. |
| 2010/0024371 A1 | 2/2010 | Rieger |
| 2010/0146920 A1 | 6/2010 | Iddings et al. |
| 2010/0242425 A1 | 9/2010 | Swanson et al. |
| 2010/0263339 A1 | 10/2010 | Steins et al. |
| 2010/0263344 A1 | 10/2010 | Haynam et al. |
| 2010/0294707 A1 | 11/2010 | Abdalla et al. |
| 2011/0073538 A1 | 3/2011 | Jiang et al. |
| 2011/0094197 A1 | 4/2011 | Ruhland et al. |

\* cited by examiner

… (1)

FILTER ELEMENT WITH PERCUSSION BAND

CROSS REFERENCE TO RELATED APPLICATIONS

This application is a division of U.S. patent application Ser. No. 13/571,815, filed Aug. 10, 2012, which is a division of U.S. patent application Ser. No. 13/410,369, filed Mar. 2, 2012, now U.S. Pat. No. 8,241,377, issued Aug. 14, 2012, which is a division of U.S. patent application Ser. No. 12/545,497, filed Aug. 21, 2009, now U.S. Pat. No. 8,128,719, issued Mar. 16, 2012.

BACKGROUND AND SUMMARY

The invention relates to filter elements.

Filter elements for filtering fluid are known in the prior art including annular filter elements (cylindrical, oval, elliptical, racetrack shaped, and other closed-loop shapes), and including panel filter elements. The filter element typically includes filter media having a border or perimeter having a frame and/or seal therealong. An annular filter element typically includes annular filter media having a hollow interior and extending axially between first and second axial ends, with the first axial end being open and defining an axial flow path therethrough communicating with the hollow interior, and with fluid flowing axially along the axial flow path through the noted open axial end. A panel filter element is typically flat and may have a rectangular shaped perimeter. During servicing, it is not uncommon for service personnel to remove the filter element from its housing and attempt to percussively clean same by striking the perimeter or border of the filter element (e.g. one or both of the axial ends of an annular filter element; e.g. the edge of the perimeter or border of a panel filter element) against an impact surface, to dislodge and shake free containment and dirt. This can damage the filter element including seals, which in turn can open a bypass flow path, defeating the filter function when the filter element is re-installed.

The present invention arose during continuing development efforts in the above technology, including directed toward solving the noted problems.

BRIEF DESCRIPTION OF THE DRAWINGS

Prior Art

FIG. 1 is taken from FIG. 1 of the noted incorporated '598 patent.

FIG. 2 is taken from FIG. 2 of the '598 patent and is sectional view taken along line 2-2 of FIG. 1

FIG. 3 is taken from FIG. 3 of the '598 patent and shows the open axial end of a closed loop pleated media filter element prior to potting of the end cap.

FIG. 4 is taken from FIG. 4 of the '598 patent and shows the open axial end of the filter element of FIG. 3 after potting of the end cap.

FIG. 5 is taken from FIG. 5 of the '598 patent and is a view of a mold for molding an end cap onto pleated filter media of a filter element.

FIG. 6 is taken from FIG. 6 of the '598 patent and is a view like a portion of FIG. 2 and shows an alternate embodiment.

FIG. 7 is taken from FIG. 7 of the '598 patent and is like FIG. 2 and shows the invention of the '598 patent.

FIG. 8 is taken from FIG. 8 of the '598 patent and is like FIG. 3 and shows the invention of the '598 patent.

FIG. 9 is taken from FIG. 9 of the '598 patent and is like FIG. 4 and shows the invention of the '598 patent.

FIG. 10 is taken from FIG. 10 of the '598 patent and is like FIG. 5 and shows the invention of the '598 patent.

FIG. 11 is taken from FIG. 11 of the '598 patent and is like FIG. 6 and shows the invention of the '598 patent.

FIG. 12 is taken from FIG. 12 of the '598 patent and is like FIG. 7 and shows a further embodiment.

FIG. 13 is taken from FIG. 13 of the '598 patent and is like FIG. 7 and shows a further embodiment.

FIG. 14 is taken from FIG. 14 of the '598 patent and is like FIG. 9 and shows a further embodiment.

Present Invention

Figure 4:
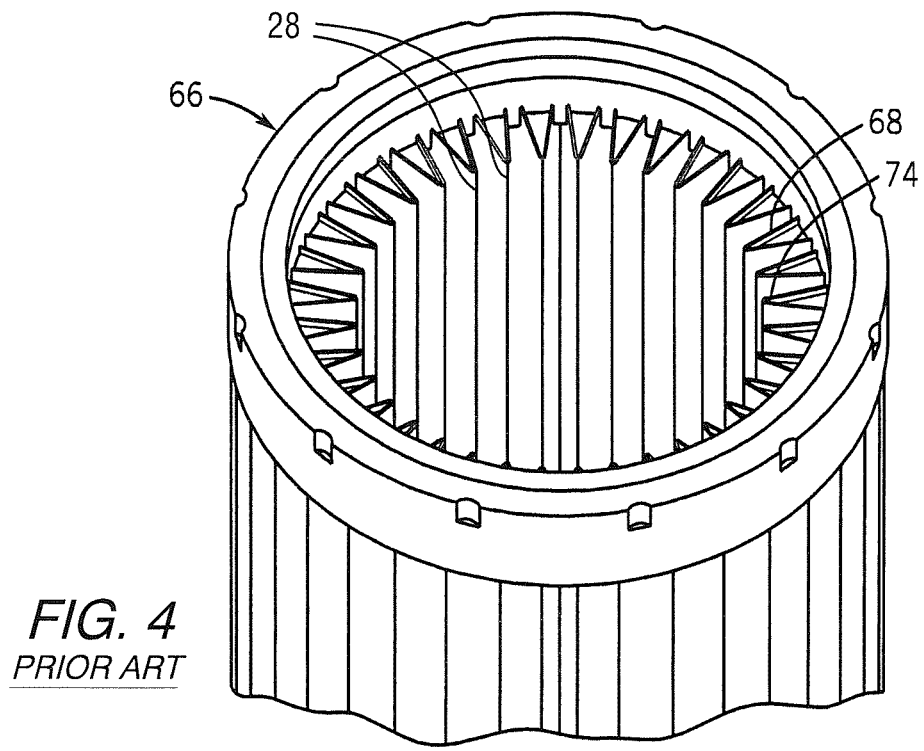
Figure 9:
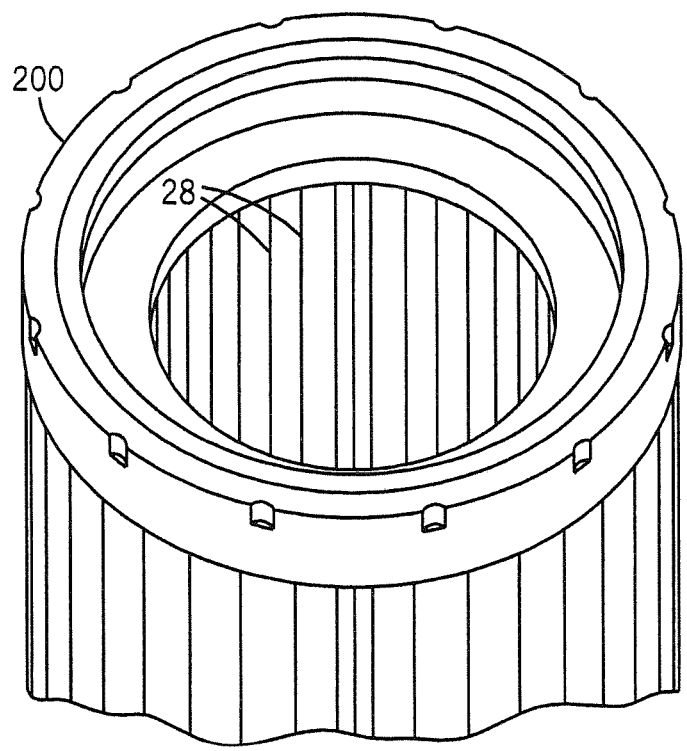
Figure 15:
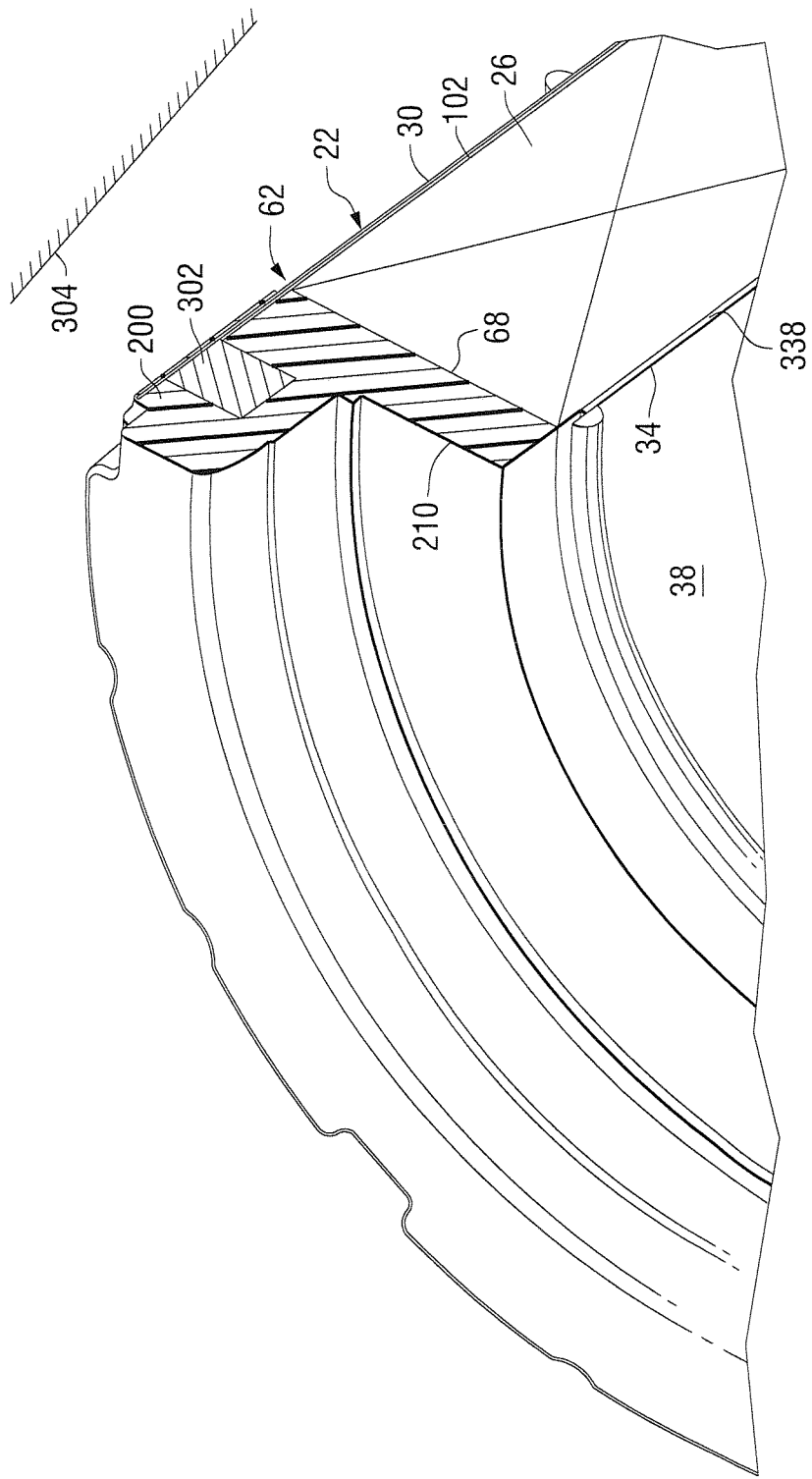

FIG. 15 is like a portion of FIGS. 4 and 9 and shows the present invention.

Figure 16:
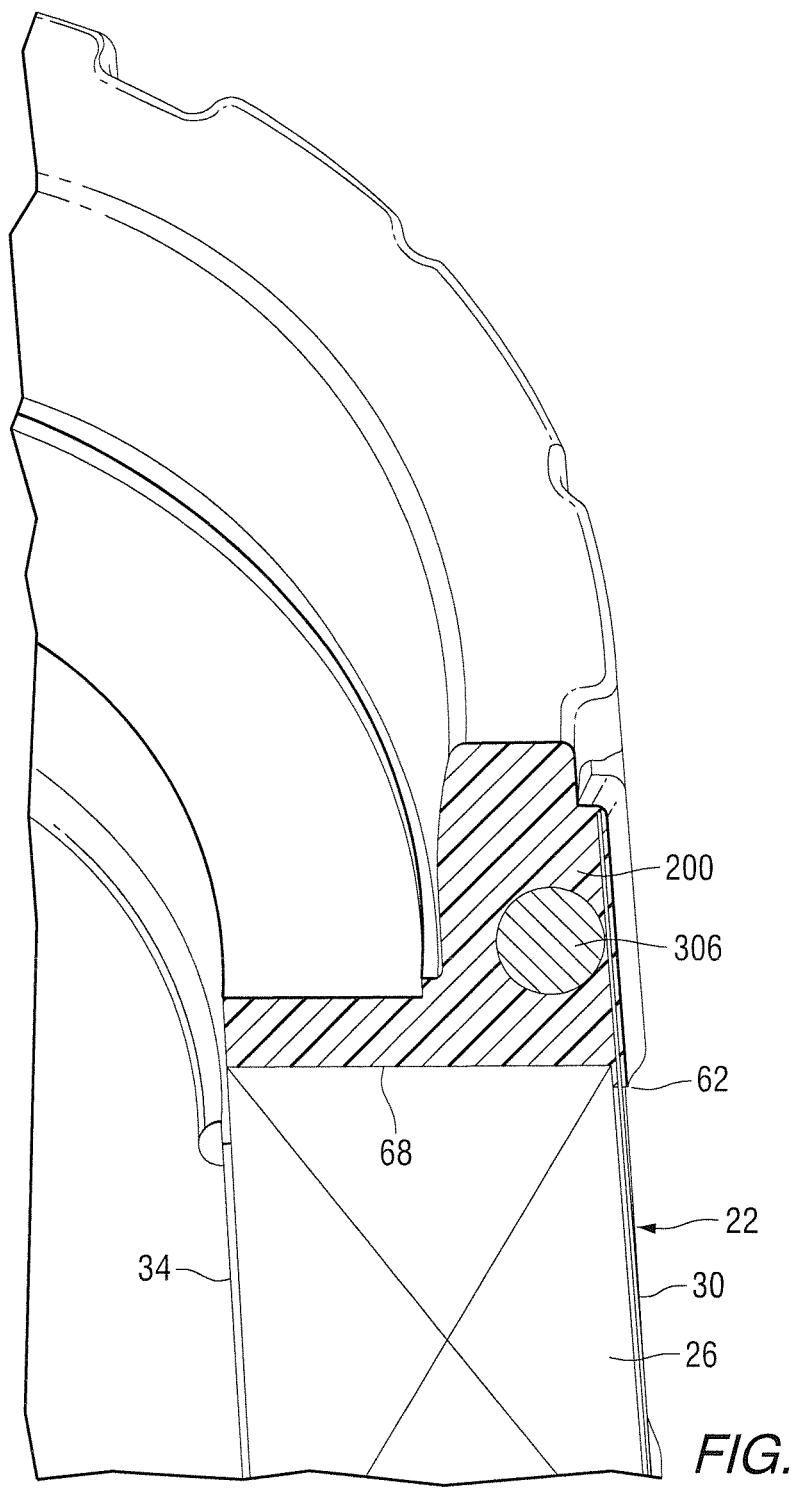

FIG. 16 is like FIG. 15 and shows a further embodiment.

Figure 17:
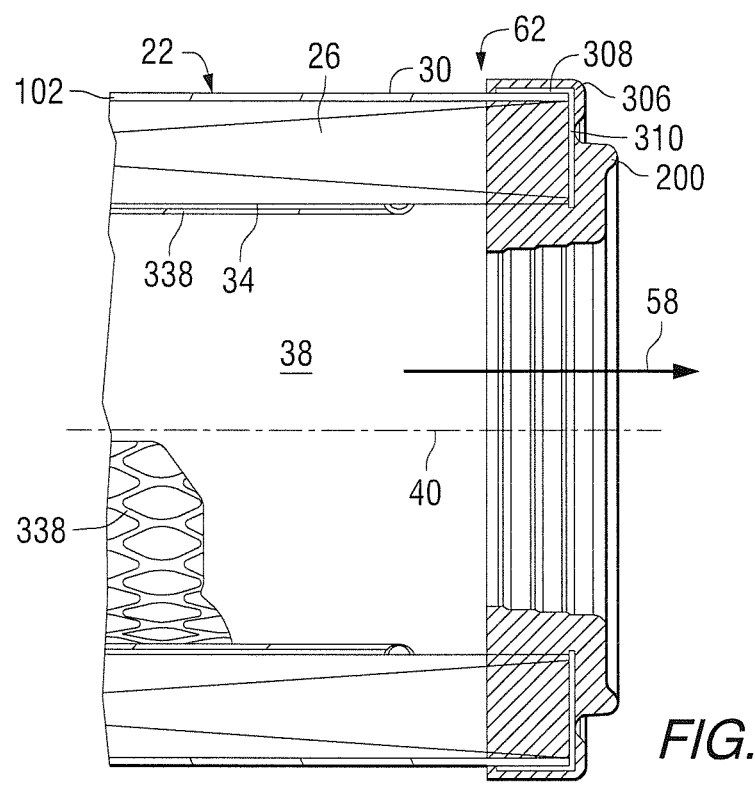

FIG. 17 is like a portion of FIGS. 2, 6, 7, 11, 12, 13 and shows the present invention.

Figure 18:
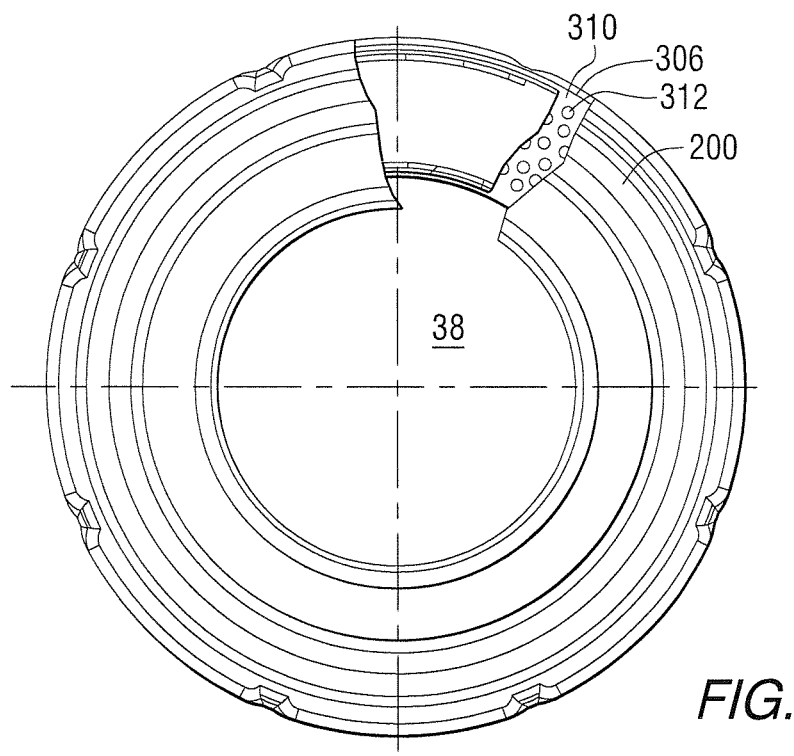

FIG. 18 is an end view partially cutaway of the construction of FIG. 17.

Figure 19:
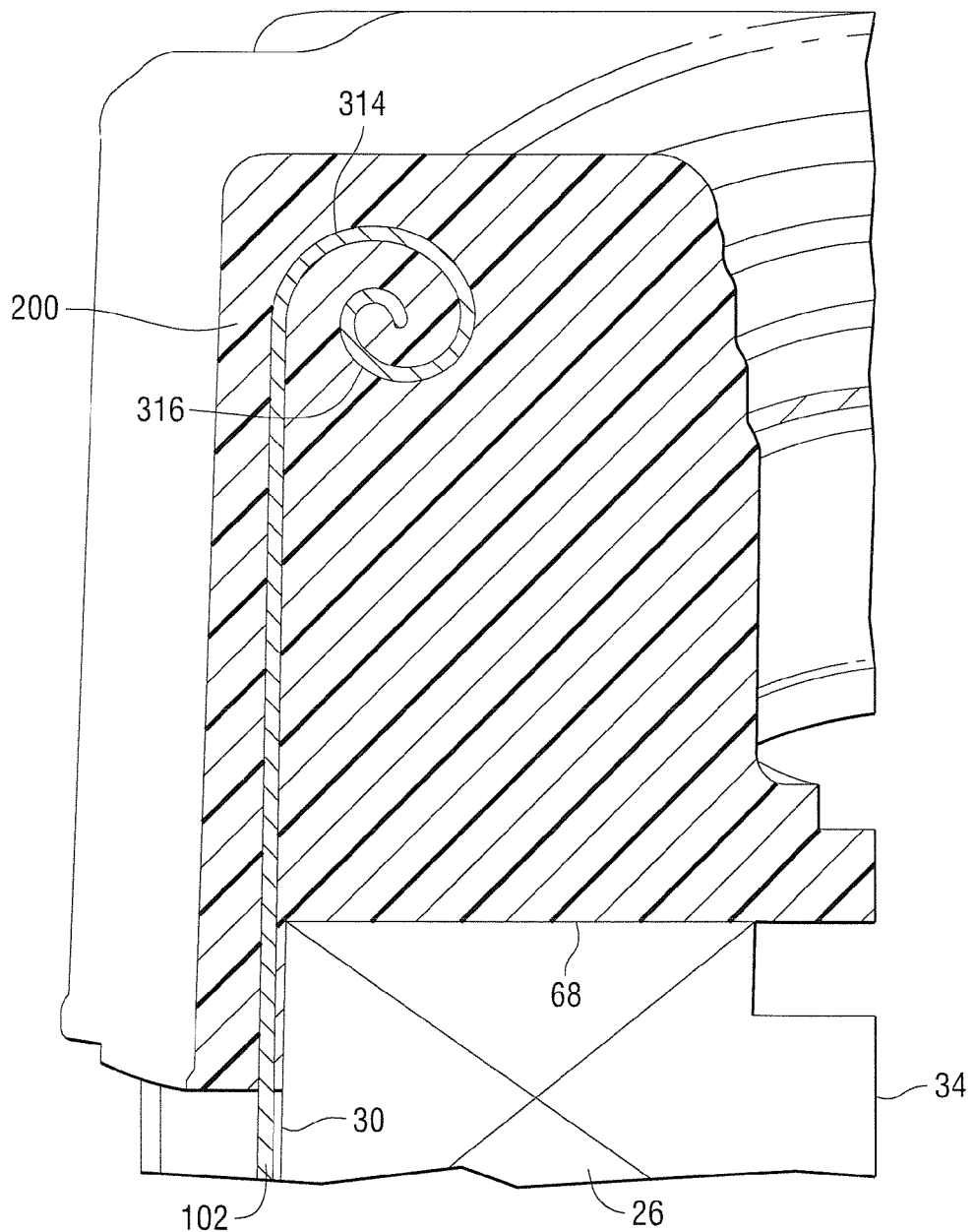

FIG. 19 is like FIG. 15 and shows a further embodiment.

Figure 20:
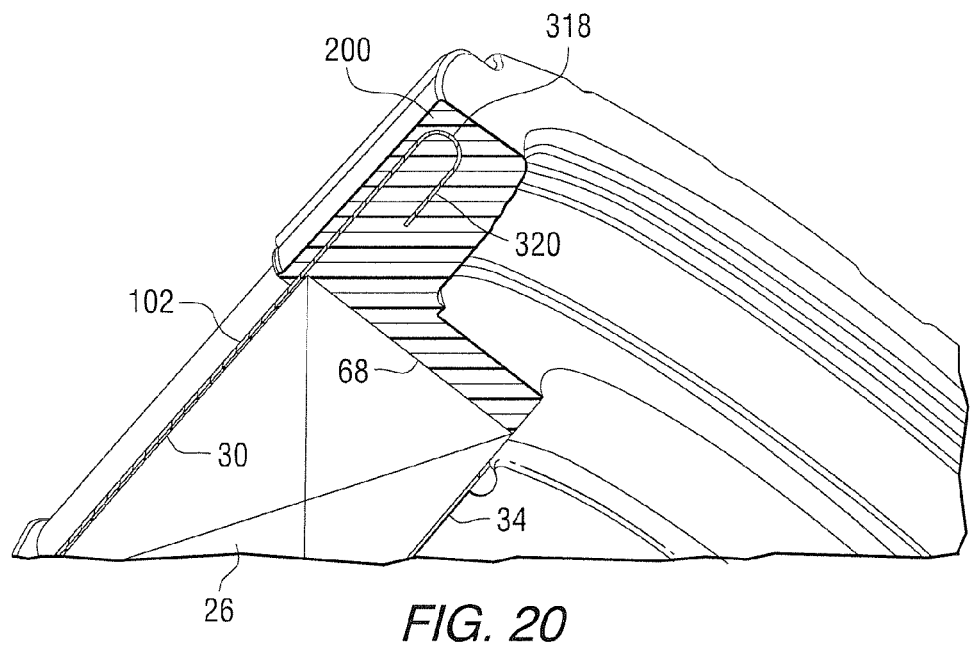

FIG. 20 is like FIG. 19 and shows a further embodiment.

Figure 21:
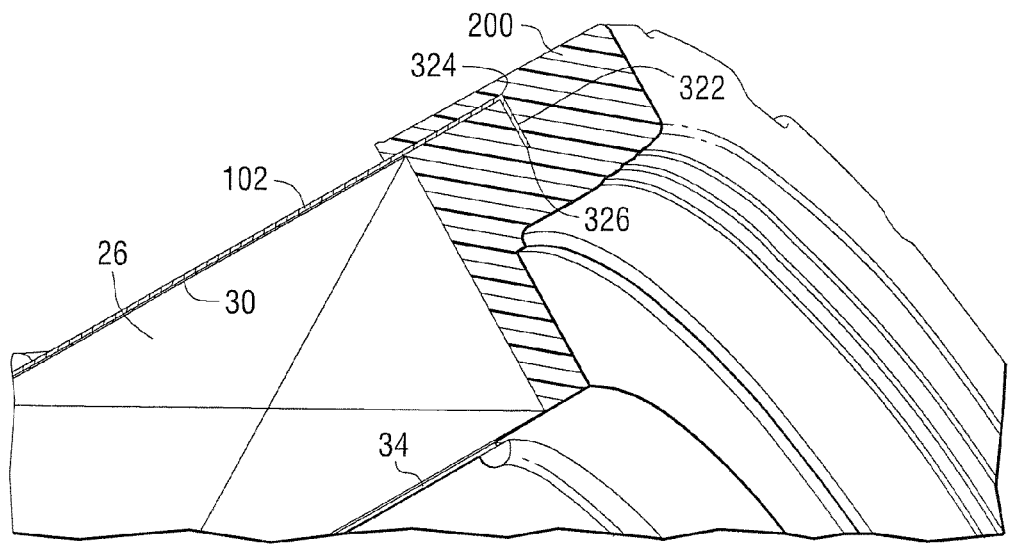

FIG. 21 is like FIG. 20 and shows a further embodiment.

Figure 22:
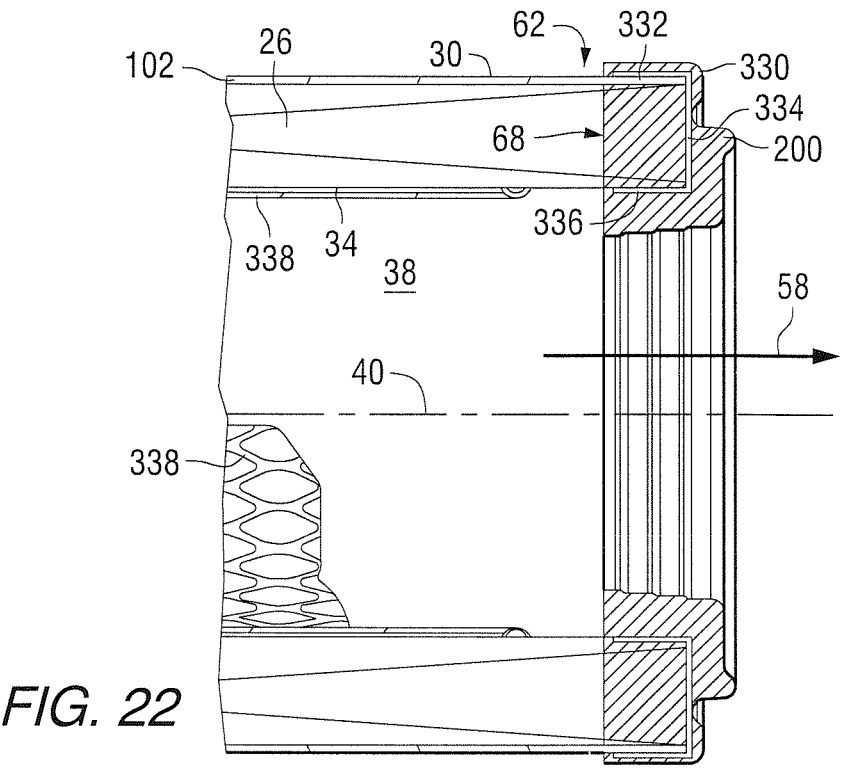

FIG. 22 is like FIG. 17 and shows a further embodiment.

Figure 23:
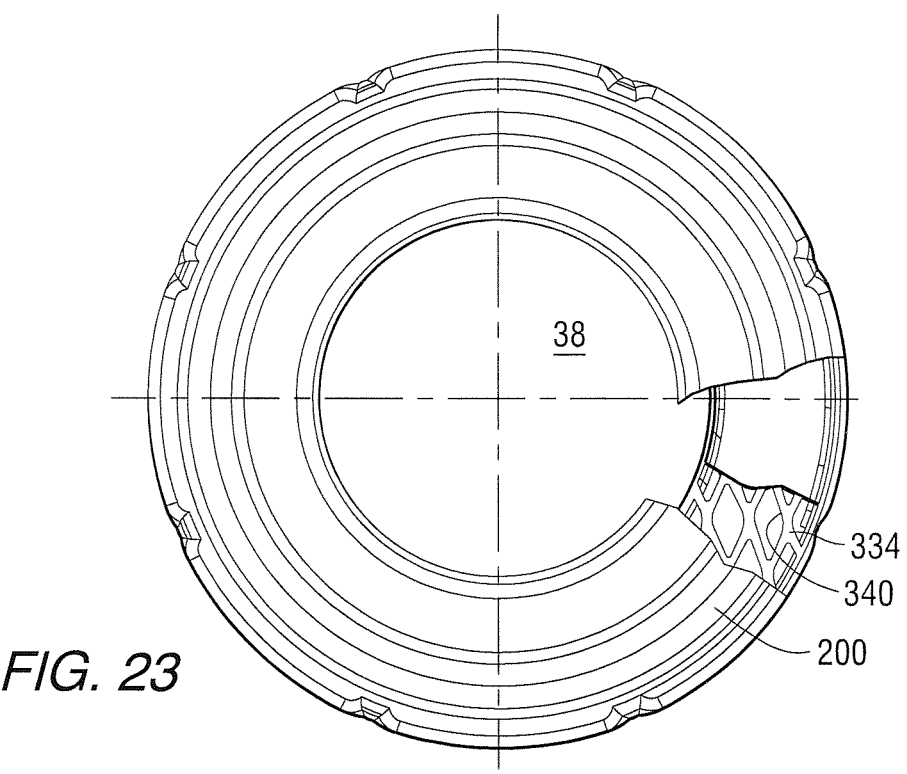

FIG. 23 is an end view partially cutaway of the construction of FIG. 22.

Figure 24:
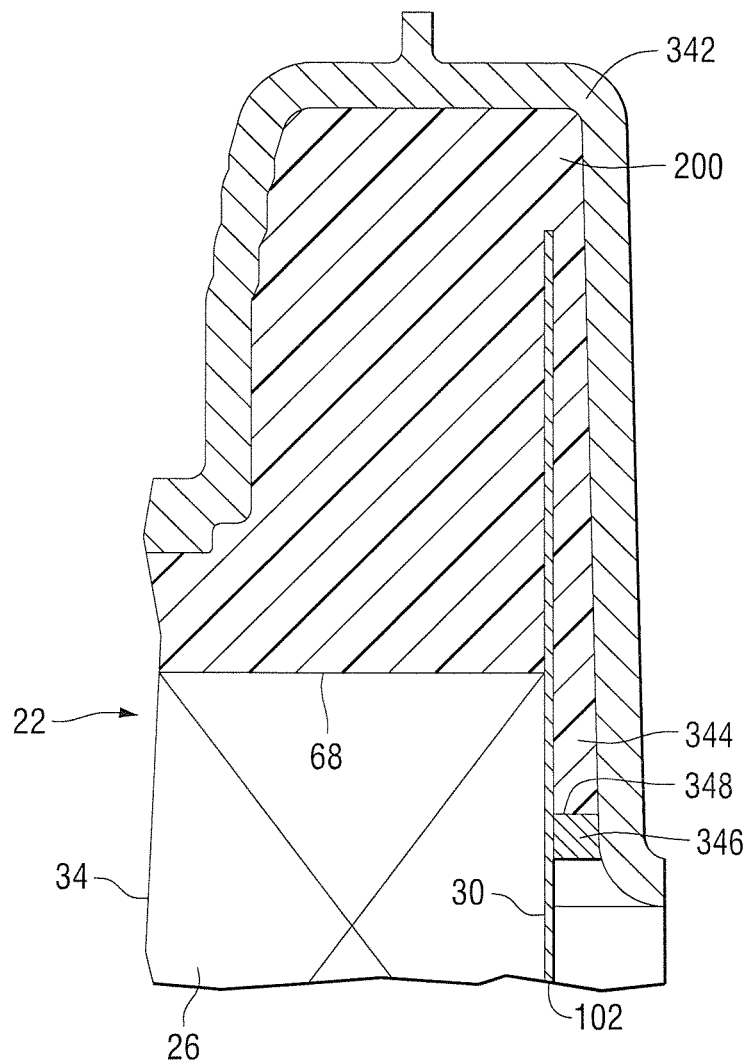

FIG. 24 is like FIG. 16 and shows a further embodiment.

Figure 25:
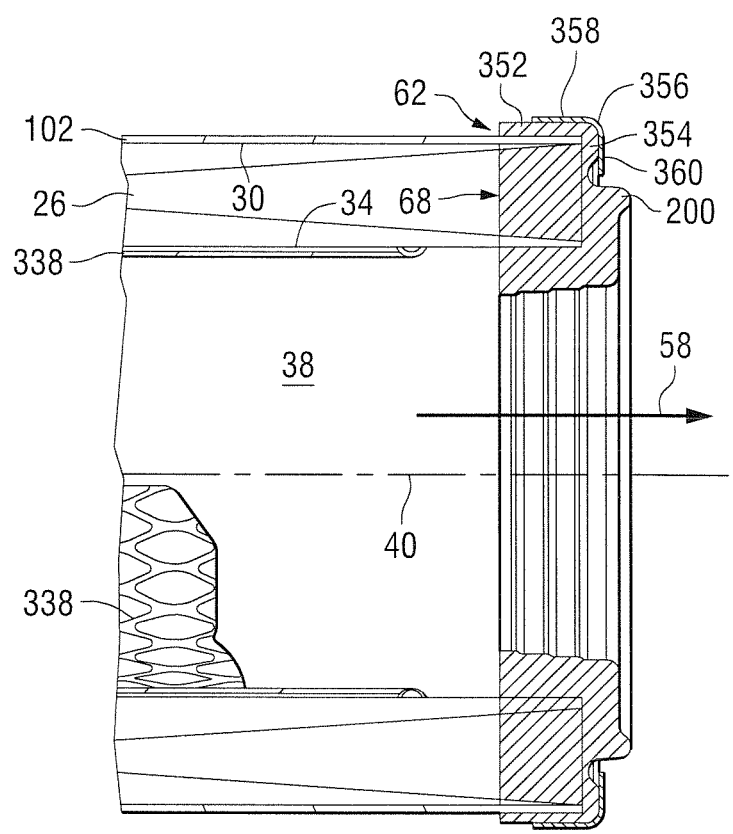

FIG. 25 is like FIG. 22 and shows a further embodiment.

Figure 26:
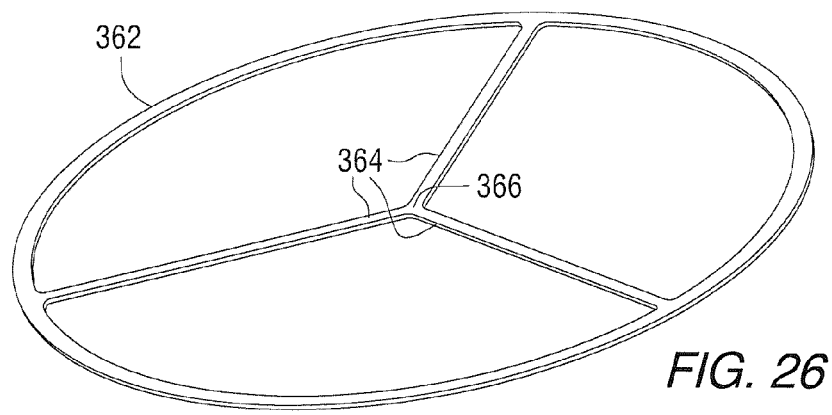

FIG. 26 is a perspective view of a component for use in a filter element in accordance with the invention.

Figure 27:
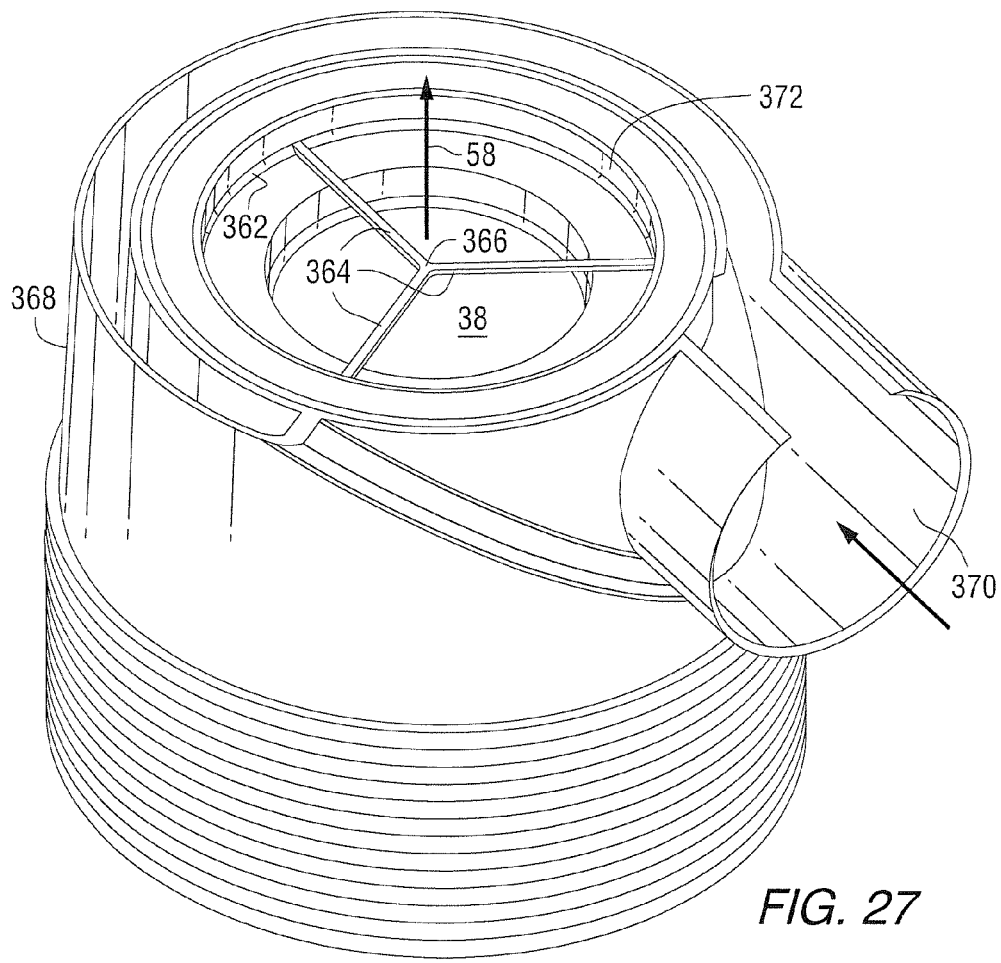

FIG. 27 is a perspective view of a partially assembled filter including the component of FIG. 26.

Figure 28:
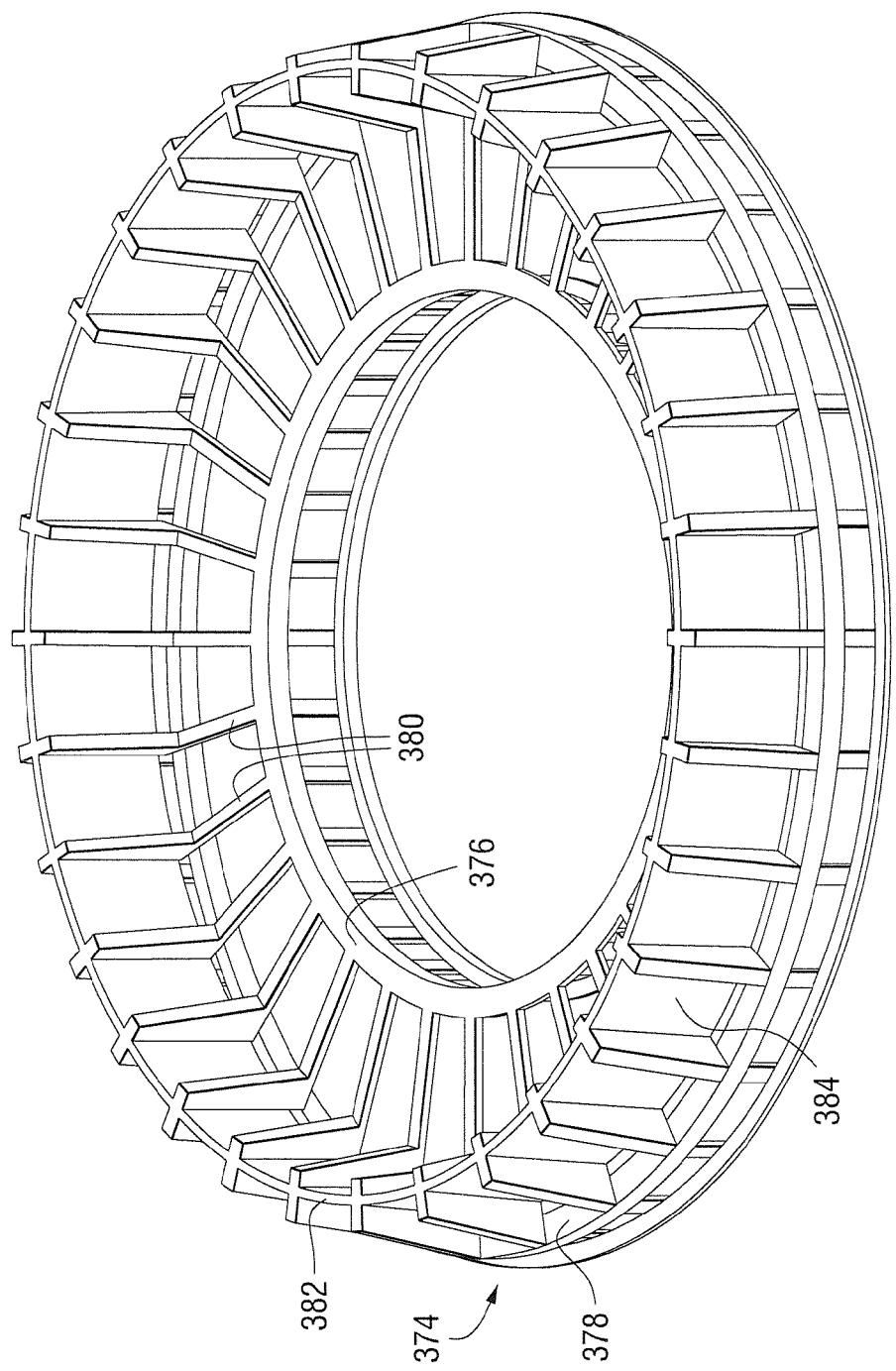

FIG. 28 is like FIG. 26 and shows a further embodiment.

Figure 29:
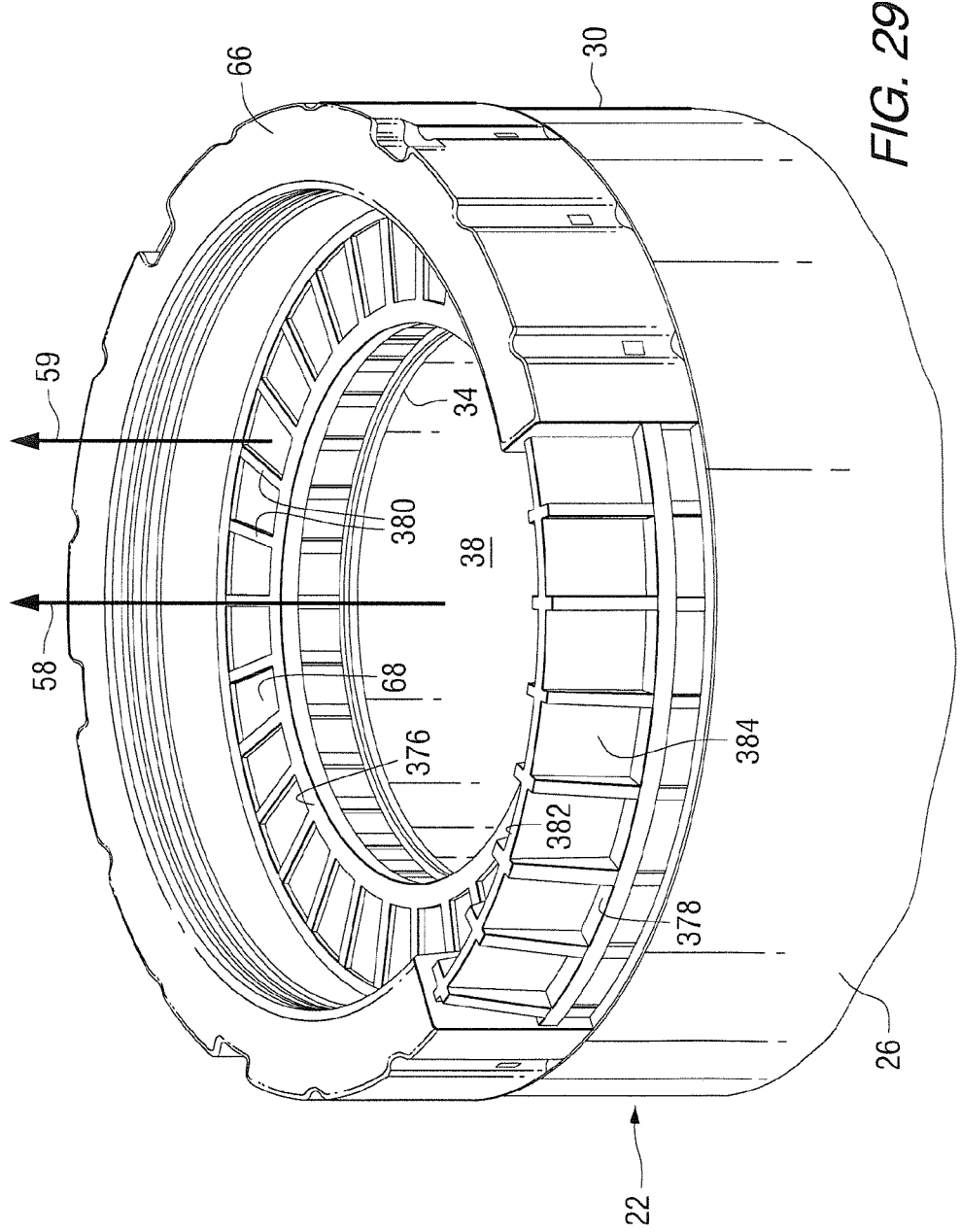

FIG. 29 is a perspective view partially cutaway of a filter element incorporating the component of FIG. 28.

Figure 30:
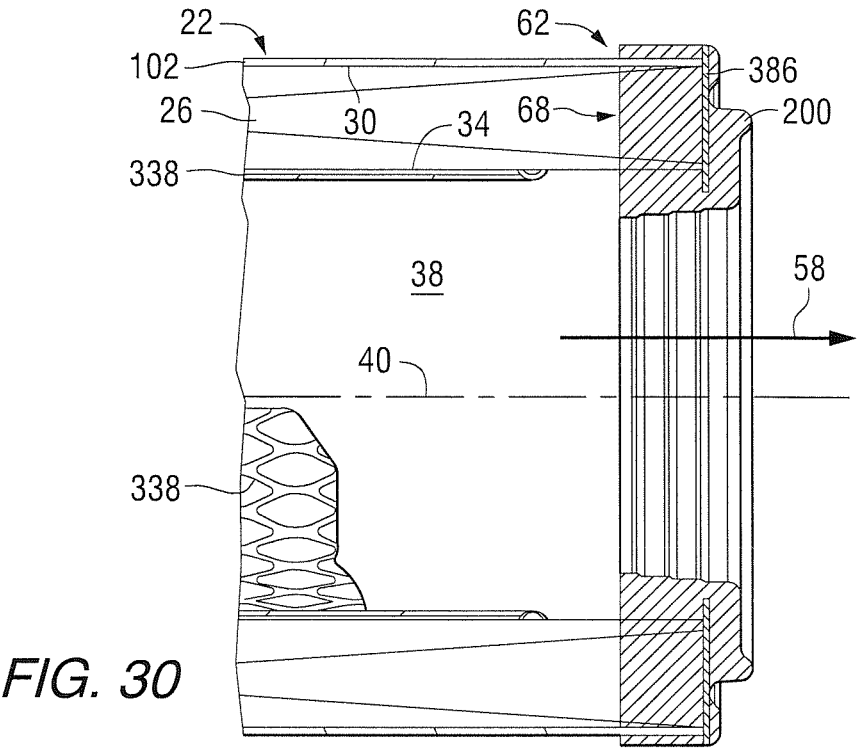

FIG. 30 is a like FIG. 25 and shows a further embodiment.

Figure 31:
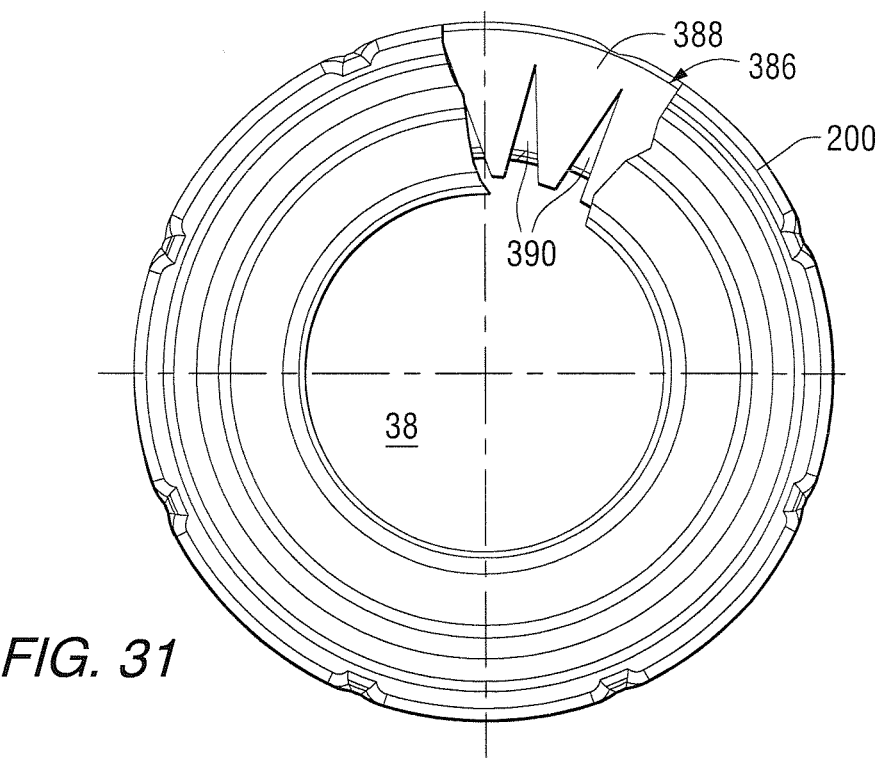

FIG. 31 is an end view partially cutaway of the construction of FIG. 30.

Figure 32:
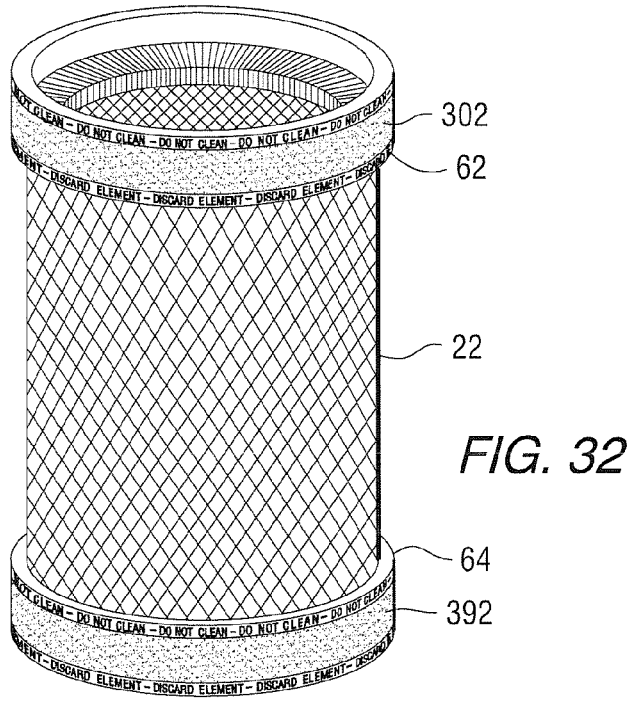

FIG. 32 is a perspective view showing a further embodiment.

Figure 33:
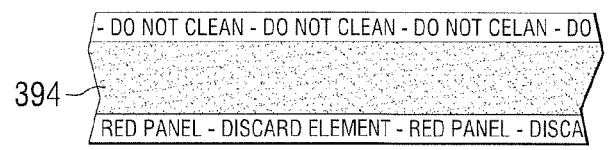

FIG. 33 is an enlarged view of a portion of FIG. 32.

Figure 34:
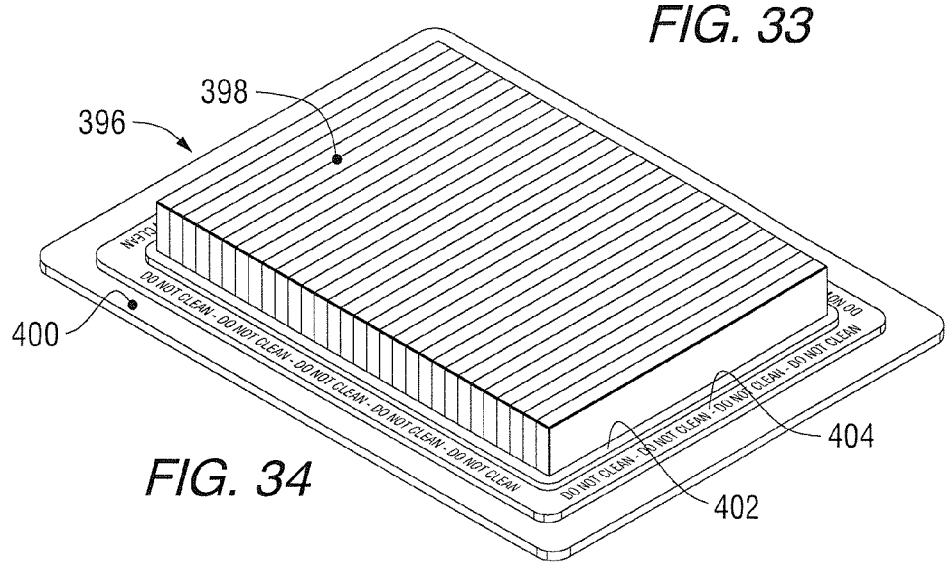

FIG. 34 is a perspective view showing a further embodiment.

DETAILED DESCRIPTION

Prior Art

The following description of FIGS. 1-14 is taken from incorporated U.S. Pat. No. 6,902,598. The '598 patent incorporates U.S. Pat. Nos. 6,149,700, 6,261,334, 6,391,076, 6,398,832, which are also all incorporated herein by reference.

Figure 1:
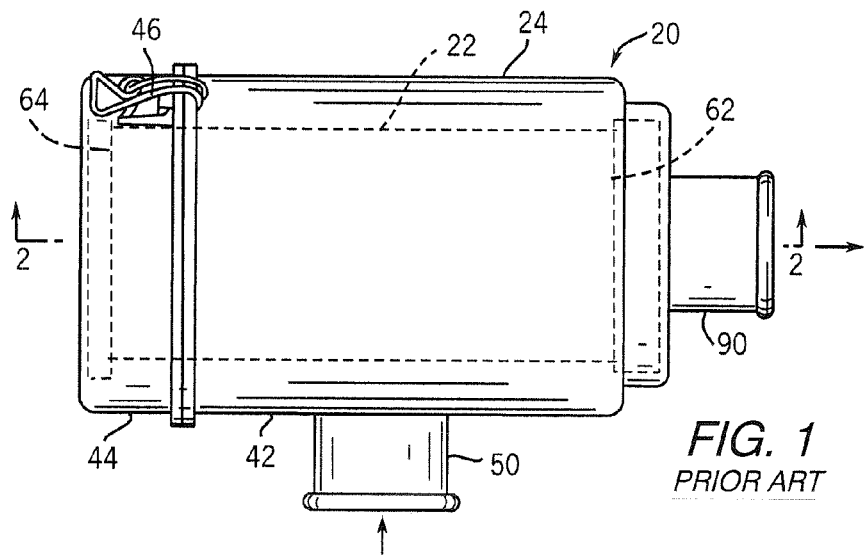
FIGS. 1-14 are taken from U.S. Pat. No. 6,902,598, incorporated herein by reference.
Figure 2:
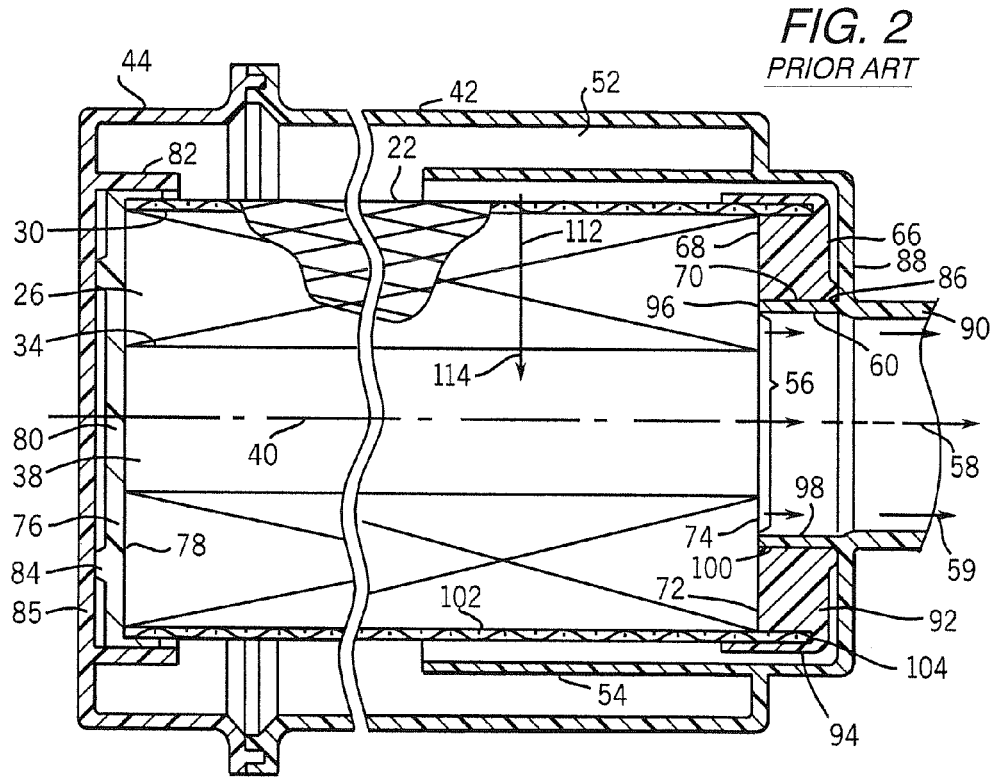

FIGS. 1 and 2 show a filter 20 including a filter element 22 contained within a housing 24. Filter element 22 is provided by pleated filter media 26, FIG. 2, having a plurality of pleats 28, FIGS. 3, 4, in a closed loop, typically an annulus, having an outer perimeter 30 defined by a plurality of outer pleat tips 32, and an inner perimeter 34 defined by a plurality of inner pleat tips 36. The annular closed loop has a hollow interior 38 extending along an axis 40. Housing 24 is typically cylindrical and is provided by housing sections 42 and 44 mounted to each other in conventional manner such as by overcenter spring clip type clamps such as 46, or in other suitable manner. The housing has an inlet 50 admitting inlet fluid, such as air or liquid, radially and/or tangentially into annular space 52 within the housing around filter element 22. Alternatively, the inlet may be at an axial end of the housing, for example as in incorporated U.S. Pat. No. 6,391,076. The housing may include an interior dam or deflection surface 54 for blocking direct impact against filter element 22 and/or for directing flow, for example in a spiral or toroidal pattern. The fluid flows laterally or radially inwardly through filter media 26 into hollow interior 38, and then the clean fluid flows axially rightwardly in FIG. 2 in hollow interior 38 along flow passage 56 as shown at arrows 58, 59. Alternatively or additionally, the fluid may flow axially through the filter media as in the noted incorporated '076 patent.

Flow passage 56 extending along axis 40 circumscribes hollow interior 38 and has a flow perimeter 60 greater than inner perimeter 34 defined by inner pleat tips 36, as described in the incorporated '700 patent. Flow perimeter 60 is less than outer perimeter 30 defined by outer pleat tips 32. Inner perimeter 34 defines and bounds a first cross-sectional area. Flow perimeter 60 defines and bounds a second cross-sectional area. The second cross-sectional area is greater than the first cross-sectional area. Outer perimeter 30 defines and bounds a third cross-sectional area. The second cross-sectional area is less than the third cross-sectional area. Filter element 22 has first and second axial ends 62 and 64. Axial end 62 is open and provides axial flow passage 56 therethrough. An end cap 66 of soft resilient compressible material, such as foamed potted urethane, axially abuts the axial ends 68 of the pleats. End cap 66 has an inner perimeter 70 greater than inner perimeter 34 defined by inner pleat tips 36. End cap 66 partially covers the axial ends 68 of the pleats such that the laterally outward portions 72 of the axial ends 68 of the pleats 28 are covered by end cap 66 but not the laterally inward portions 74 of the axial ends 68 of the pleats, such that the laterally inward portions 74 of the axial ends of the pleats are uncovered and exposed at axial end 62 of filter element 22, FIG. 4.

In one embodiment, second axial end 64 of filter element 22 is closed. A second end cap 76, FIG. 2, of soft compressible resilient material, such as foamed potted urethane, is provided at second end 64 of filter element 22 and completely covers the axial ends 78 of the pleats including the outer pleat tips 32 and the inner pleat tips 36 at axial end 64. End cap 76 also includes a central section 80 spanning and completely covering hollow interior 38 of filter element 22 at axial end 64 of the filter element. Housing section 44 includes an annular interior sidewall 82 extending partially axially into the housing to locate and retain filter element 22 at axial end 64. In other embodiments, central section 80 of end cap 76 is omitted, and a portion of housing 44 extends into hollow interior 38 of filter element 22 to close axial end 64 of the filter element and to position axial end 64 of the filter element within the housing. Further embodiments are shown in the noted incorporated '076 patent. End cap 76 includes an annular ridge 84 engaging axial end wall 85 of housing section 44 and slightly axially compressed thereagainst to further aid in retention of filter element 22 within the housing and to accommodate axial tolerances. End cap 66 also includes an annular ridge 86 engaging axial end wall 88 of housing section 42 and slightly radially compressed thereagainst to aid in retaining filter element 22 within the housing and to accommodate axial tolerances and also to provide an axial seal to prevent bypass of dirty air from annular chamber 52 around axial end 62 of the filter element. Axial end wall 88 of housing section 42 has an outlet flow tube 90 extending therethrough.

In addition to or alternatively to the axial seal at 86, end cap 66 provides a radial seal at 70 against outlet flow tube 90.

End cap 66 has a sidewall 92 extending axially away from axial ends 68 of pleats 28 at axial end 62 of filter element 22. The sidewall has the noted inner perimeter 70, and has an outer perimeter 94. As noted above, inner perimeter 70 of sidewall 92 is greater than inner perimeter 34 of filter element 22 defined by inner pleat tips 36. Inner perimeter 70 of sidewall 92 of end cap 66 is less than outer perimeter 30 of filter element 22 defined by outer pleat tips 32. Outer perimeter 94 of sidewall 92 of end cap 66 is greater than outer perimeter 30 of filter element 22 defined by outer pleat tips 32. Flow tube 90 has an inner section 96 axially facing the axial ends 68 of pleats 28. Inner section 96 of flow tube 90 has an inner perimeter 98 and an outer perimeter 100. Outer perimeter 100 is greater than inner perimeter 70 of sidewall 92 of end cap 66, such that as filter element 22 at end cap 66 is axially slid rightwardly over inner section 96 of flow tube 90, end cap 66 is radially compressed to expand inner perimeter 70 along outer sidewall 100 of flow tube inner section 96 to effect the noted radial seal. Inner perimeter 70 of end cap 66 is preferably stepped, as shown at 71 in FIG. 8 of the noted incorporated '700 patent, to have slightly progressively decreasing diameters from right to left as viewed therein, to receive and guide inner section 96 of flow tube 90 therealong and increase radial sealing pressure. End cap 66 circumscribes inner section 96 of flow tube 90 and bears radially thereagainst at 70 in sealing relation to form the noted radial seal thereat. End wall 88 of housing section 42 axially faces axial ends 68 of pleats 28, and end cap 66 also bears axially against end wall 88 in sealing relation at 86 to form the noted axial seal thereat.

An outer liner 102, FIG. 2, provided by an expanded wire mesh or screen or perforated metal or plastic, circumscribes filter element 22 along outer pleat tips 32 and has an axial end section 104 extending axially beyond the axial ends 68 of pleats 28. An inner liner may also be provided at inner perimeter 34 along inner pleat tips 36. As above described, flow tube 90 communicates with hollow interior 38 of the filter element along flow passage 56 and extends axially from the axial end of the filter element. End cap 66 at the axial end of the filter element bears radially between and is radially compressed between and against section 104 of outer liner 102 and inner section 96 of flow tube 90. Outer liner 102 extends axially at 104 into end cap 66 and is potted therein during the molding process, as described in the incorporated '700 patent. As noted above, sidewall 92 of end cap 66 extends axially away from the axial ends 68 of pleats 28 at the axial end of the filter element. Outer perimeter 94 of the end cap sidewall circumscribes outer liner section 104. The filter element may also include an inner liner 103, FIG. 5, along inner pleat tips 36.

Figure 3:
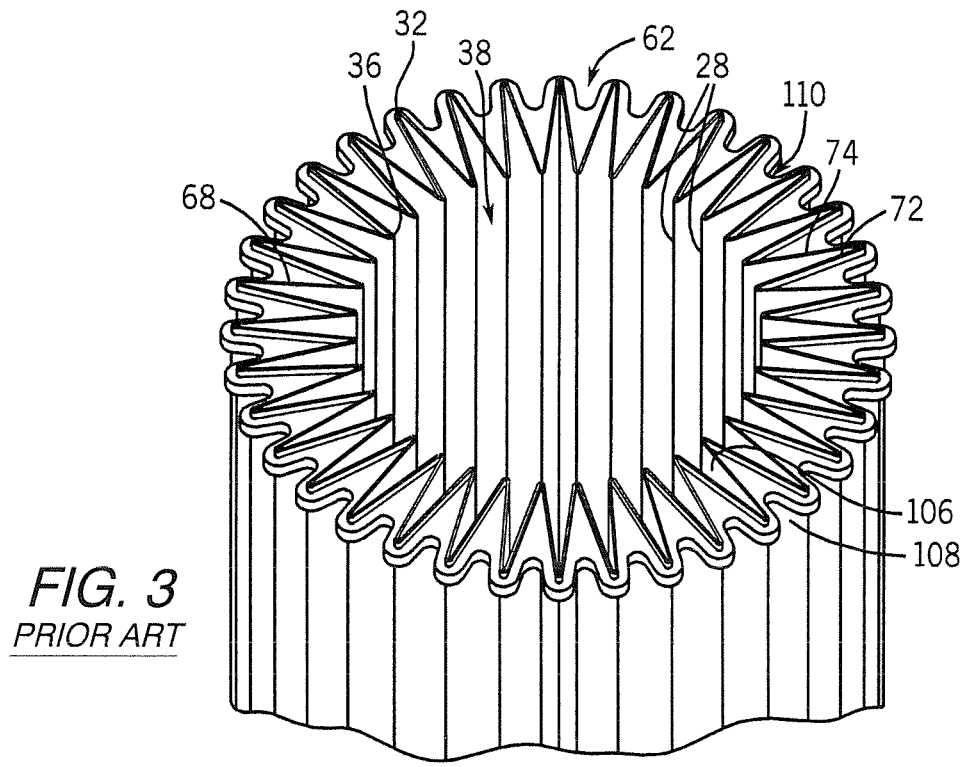
Figure 6:
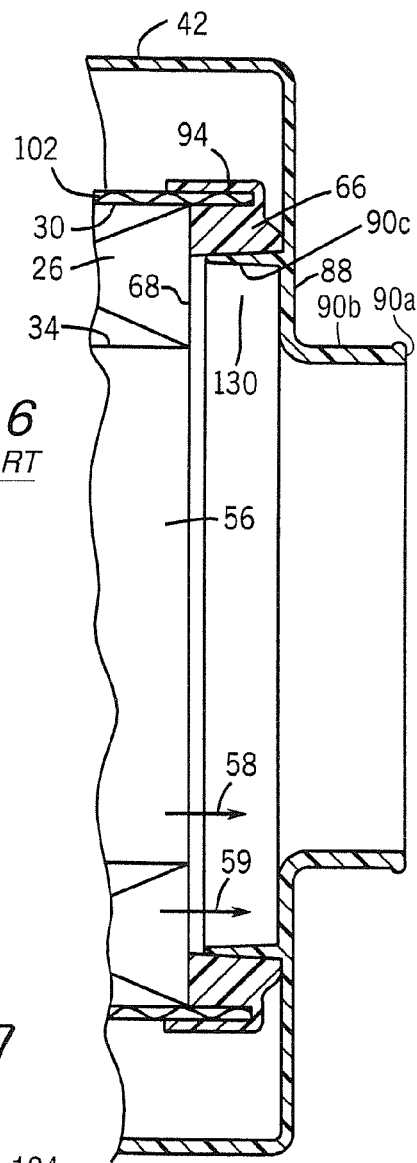
Figure 7:
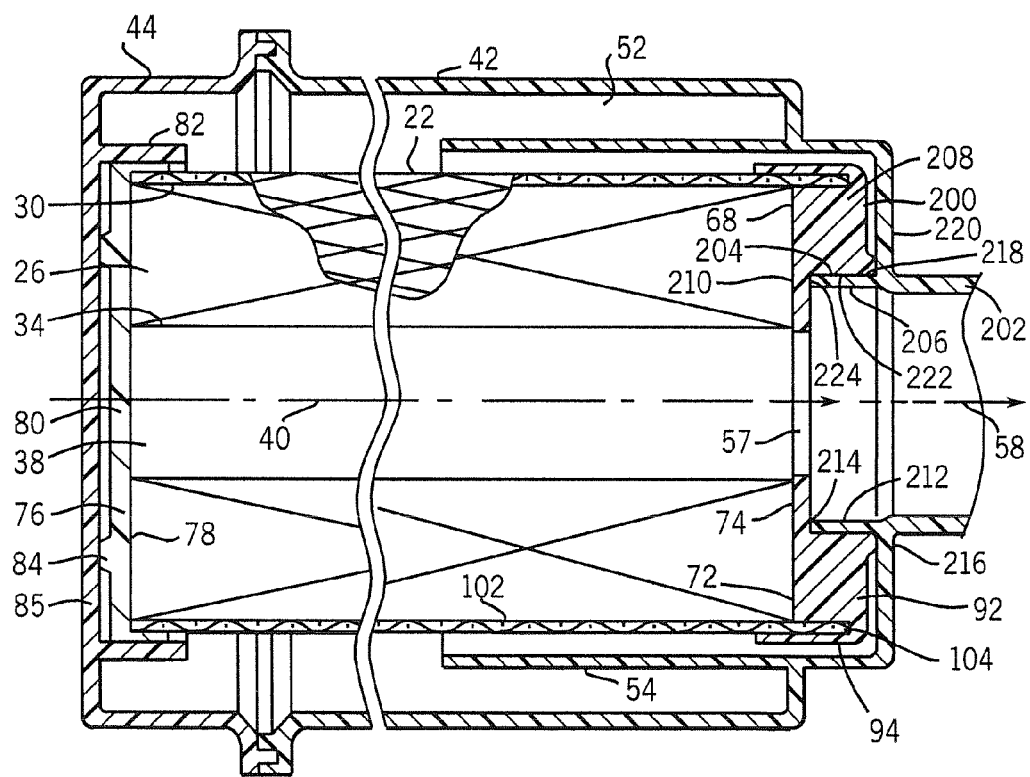
Figure 8:
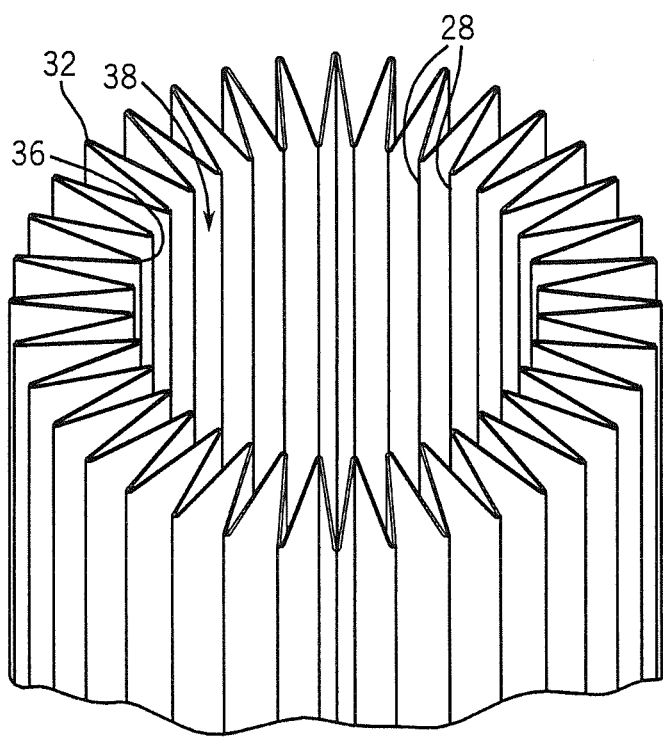

Pleats 28 have pairs of walls defining axially extending interior channels 106, FIG. 3, and also as shown in FIG. 7 of the incorporated '700 patent, and axially extending exterior channels 108. The walls of the pleats defining the exterior channels 108 are sealed to each other near axial end 62 of the filter element by heat seal bonding along glue strips, also known as hot melt, such as 110, and as shown in the incorporated '700 patent at FIGS. 4-6, 9, and for example as disclosed in U.S. Pat. No. 5,106,397, incorporated herein by reference. This prevents bypass of dirty air around the axial ends of the pleats at inner exposed portions 74. Fluid such as air flowing radially inwardly through the filter media as shown at 112, and as shown in the incorporated '700 patent at FIG. 4, or alternatively flowing axially as shown in the incorporated '076 patent at FIGS. 15, 16 thereof, must flow through the sidewalls of pleats 28 before such fluid can flow axially through hollow interior 40 as shown at arrow 58 or axially through the inward portions 74 of the axial ends 68 of the pleats as shown at arrow 59. Some of such air can flow axially rightwardly as shown at arrow 59 axially along interior channels 106, and the balance of the air continues radially inwardly as shown at arrow 114, and as shown in the incorporated '700 patent in FIG. 4, and then flows axially as shown at arrow 58. The axial ends of exterior channels 108 at the axial end of the filter element are blocked by the noted hot melt seal bonding along adhesive strips 110. Fluid flowing through the filter element is forced to pass from exterior channels 108 to interior channels 106. FIGS. 6 and 9 of the incorporated '700 patent show the seal bonded adhesive 110 extending in exterior channels 108 all the way from inner pleat tips 36 to outer pleat tips 32 as idealized. If the seal bond does not extend all the way from inner pleat tip 36 to outer pleat tip 32, then the shape of the interior channel 106 at outer pleat tip 32 will generally be more rounded and the walls of pleats 28 forming exterior channels 108 at outer pleat tips 32 will usually be closer together. In an alternative, the adhesive seal bond in exterior channels 108 may extend from inner pleat tips 36 only partially towards outer pleat tips 32, and the outer portions of exterior channels 108 are blocked at the axial end of the filter element at end cap 66. During the molding potting process, the liquid castable material into which the pleated filter media is dipped will foam up a short distance axially into the channels between the pleats, as shown in the incorporated '700 patent at inner section 116 in FIGS. 4, 8, 9 thereof, of the end cap which has migrated a distance 118, FIG. 4 of the incorporated '700 patent, between the pleats. The spacing of glue strips 110 on the pleats from the axial ends 68 of the pleats may be adjusted as desired in standard glue seal strip applicator machines. Preferably, glue seal strips 110 are spaced from axial ends 68 of the pleats by a small distance 118 to enable a slight deformation of the axial ends 68 of the pleats by a dam in the mold during the molding potting process, to keep the liquid castable material of the end cap from flowing radially inwardly into inner portions 74 of the pleat ends which are desired to be exposed, which molding process and dam are disclosed in the noted '700 patent, and noted hereinafter. Alternatively, seal glue strips 110 may be applied at axial ends 68 of the pleats, without gap 118 therebetween.

Figure 5:
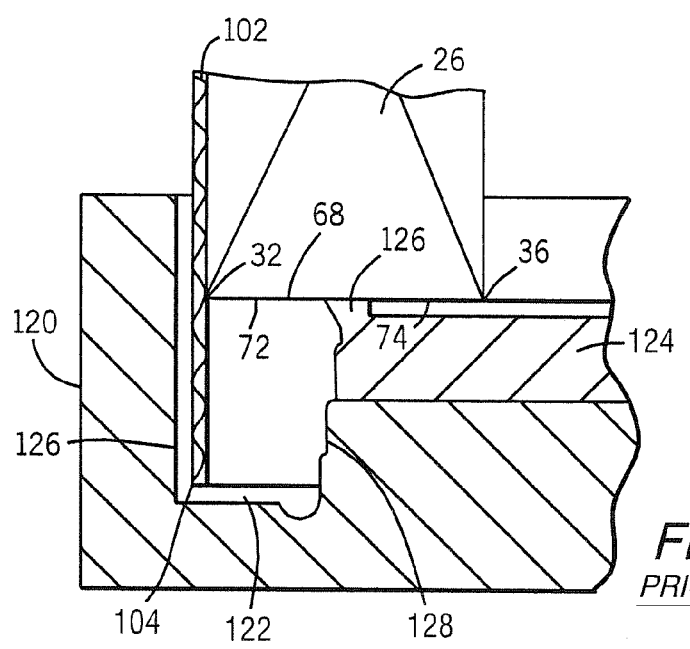

FIG. 5 shows a mold 120 for molding or potting end cap 66 onto pleated filter media 26 of the filter element. The mold has a trough 122 extending along an annular first perimeter and holding liquid castable material, such as urethane, therein into which axial ends 68 of pleats 28 are dipped. The mold has an insert 124 with an upstanding dam 126 extending along a second annular perimeter circumscribed by the noted annular perimeter of trough 122. Dam 126 engages axial ends 68 of the pleats between outer pleat tips 32 and inner pleat tips 36 and impedes flow of liquid castable material laterally radially inwardly towards inner pleat tips 36. Trough 122 partially spans axial ends 68 of the pleats such that the laterally outward portions 72 of the axial ends of the pleats are covered by liquid castable material but not the laterally inward portions 74 of the pleats, such that laterally outward portions 72 of the axial ends 68 of the pleats are covered by end cap 66, and the laterally inward portions 74 of the axial ends 68 of the pleats are uncovered by end cap 66 and are left exposed. It is preferred that the pleated filter media be dipped into the liquid castable material in the mold by lowering the pleated filter media downwardly until axial ends 68 of the pleats are engaged by dam 126, and then pushing the pleated filter media further slightly downwardly against the dam such that the dam slightly deforms axial ends 68 of the pleats at such engagement point which in turn pushes the pleat sidewalls forming the noted channels slightly laterally to further block the channels and further impede flow of liquid castable material laterally inwardly towards inner pleat tips 36. Trough 122 is bounded by an outer perimeter 126 and an inner perimeter 128. Outer perimeter 126 of trough 122 is greater than outer perimeter 30 of the filter element defined by outer pleat tips 32. Inner perimeter 128 of trough 122 is less than outer perimeter 30 of the filter element. Inner perimeter 128 of trough 122 is greater than inner perimeter 34 of the filter element defined by inner pleat tips 36. The noted second perimeter of the mold at annular dam 126 is less than or equal to inner perimeter 128 of trough 122.

As noted, the method for molding end cap 66 onto pleated filter media 26 involves dipping axial ends 68 of the pleats into liquid castable material in trough 122 of mold 120, and engaging axial ends 68 of the pleats against dam 126 at a location between outer pleat tips 32 and inner pleat tips 36 such that dam 126 impedes flow of the liquid castable material laterally inwardly towards inner pleat tips 36. Trough 122 is provided and aligned such that it partially spans axial ends 68 of the pleats such that the laterally outward portions 72 of the axial ends of the pleats are covered by the liquid castable material during dipping, but not the laterally inward portions 74 of the axial ends of the pleats. Further in accordance with the described method, laterally inward flow of the liquid castable material is impeded along the axial ends of the pleats toward inner pleat tips 36 by providing and aligning dam 126 to engage axial ends 68 of the pleats between outer pleat tips 32 and inner pleat tips 36 such that laterally outward portions 72 of the axial ends of the pleats are covered by end cap 66, and laterally inward portions 74 of the axial ends of the pleats are uncovered by end cap 66 and are left exposed. Trough 122 and filter element 22 are aligned during the noted dipping such that outer perimeter 126 of trough 122 circumscribes outer perimeter 30 of the filter element defined by outer pleat tips 32, and inner perimeter 128 of trough 122 circumscribes inner perimeter 26 of the filter element defined by inner pleat tips 36.

FIG. 6 shows an alternate embodiment wherein outlet flow tube 90a has an outer section 90b of reduced diameter to accommodate engine compartment size and location requirements, yet maintaining an increased diameter inner section 90c maintaining the increased diameter and perimeter flow passage 56 including axial fluid flow at 58 and the extra axial fluid flow at 59, FIGS. 2 and 6. The spacing of axial end wall 88 of housing section 42 from axial ends 68 of the filter media pleats provides a plenum 130 accommodating the extra flow and reducing restriction.

The described filter construction was developed for air filters, though may be used for other fluids such as liquid. In the disclosed embodiment, fluid to be filtered flows laterally inwardly through the filter media from the outer perimeter to the inner perimeter and then flows axially in the hollow interior, such that flow passage 56 is an outlet flow passage. Alternatively, fluid to be filtered may flow axially in hollow interior 38 and then flow laterally outwardly through the filter media from the inner perimeter to the outer perimeter, in which case flow passage 56 is the inlet flow passage. In another alternative, fluid flow to or from axial end 64 of the filter element and through the media may be axial or a combination of axial and radial, for example as in the noted incorporated '076 patent. In other alternatives, metal end caps are used instead of urethane end caps, or various combinations of materials are used for the end caps. In further alternatives, outer section 90b, FIG. 7, of the flow tube has a larger inner diameter than inner section 90c.

During further development, it has been found that there are some applications where enhanced structural integrity is desired in the end cap area at 66, for example wet conditions, heavy load conditions, vibration, and the like. There are also circumstances where cost reduction is desired. There are also circumstances where even further sealing is desired.

FIGS. 7-11 are like FIGS. 2-6, respectively, and use like references numerals where appropriate to facilitate understanding. Filter element 22 is provided by pleated filter media 26 having a plurality of pleats 28 in a closed loop having an outer perimeter 30 defined by a plurality of outer pleat tips 32, and an inner perimeter 34 defined by a plurality of inner pleat tips 36, and having a hollow interior 38 extending along axis 40. Fluid flows axially in hollow interior 38 as shown at arrow 58. The filter element has first and second axial ends 62 and 64. The first axial end is open and provides an axial flow passage 57 therethrough along axis 40 communicating with hollow interior 38. A resiliently compressible end cap 200 at the open axial end covers inner and outer pleat tips 36 and 32 and spans radially along axial ends 68 of the pleats between inner and outer perimeters 34 and 30. A flow tube 202 communicates with hollow interior 38 and extends along axial flow passage 57 and engages end cap 200. Flow tube 202 at engagement 204 with end cap 200 has an inner perimeter 206 greater than inner perimeter 34 defined by inner pleat tips 36. Inner perimeter 206 of flow tube 202 at engagement 204 with end cap 200 is less than outer perimeter 30 defined by outer pleat tips 32.

End cap 200 has a first section 208 extending radially inwardly from outer perimeter 30 defined by outer pleat tips 32, and has a second section 210 extending radially outwardly from inner perimeter 34 defined by inner pleat tips 36. First and second sections 208 and 210 meet at a junction defining a step at 204 facing radially inwardly toward and engaging flow tube 202. The step at 204 has a first axial length. Flow tube 202 has an inner tubular portion 212 extending axially along step 204. Tubular portion 212 has an inner axial end 214 facing the first axial end of the filter element at axial ends 68 of the pleats and separated therefrom by section 210 of end cap 200. Flow tube 202 has a flange portion 216 extending radially from tubular portion 212 and facing the first axial end of the filter element at axial ends 68 of the pleats and axially spaced from inner axial end 214 of tubular portion 212 by a second axial length which is less than the noted first axial length, to thus provide axial compression of end cap 200 including at axial seal region 218. End cap 200 has a first axial thickness at first section 208 at outer perimeter 30, a second axial thickness at first section 208 at step 204, a third axial thickness at second section 210 at step 204, and a fourth axial thickness at second section 210 at inner perimeter 34. The noted second axial thickness is greater than the noted third axial thickness. The noted first axial thickness is greater than the noted fourth axial thickness. The noted first axial thickness is less than the noted second axial thickness. The noted third and fourth axial thicknesses are substantially the same.

In one embodiment, the filter element includes in combination the noted second end cap 76 at the second axial end 64 of the filter element at axial ends 78 of the pleats and covering inner and outer pleat tips 36 and 32 and spanning radially between inner and outer perimeters 34 and 30, and also spanning hollow interior 38 and closing the second axial end of the filter element. The filter element is preferably contained in the noted housing having an end wall 220 facing the first axial end of the filter element. Flow tube 202 is part of end wall 220.

Flow tube 202 engages end cap 200 at first, second and third engagement seals 218, 222 and 224, respectively, to provide triple sealing of end cap 200 to flow tube 202. Seals 218 and 224 are axial seals, and seal 222 is a radial seal. First inner portion 212 of flow tube 202 extends axially along step 204 and engages the step to form the noted second radial seal 222. Tubular portion 212 has the noted inner axial end 214 axially engaging end cap 200 at the noted second section 210 and forming the noted third axial seal 224. Flow tube 202 has the noted flange portion 216 extending radially from tubular 212 and axially spaced outwardly of inner axial end 214 and axially engaging end cap 200 at first section 208 and providing the noted first axial seal 218. Second radial seal 222 is axially between first and third axial seals 218 and 224.

Figure 10:
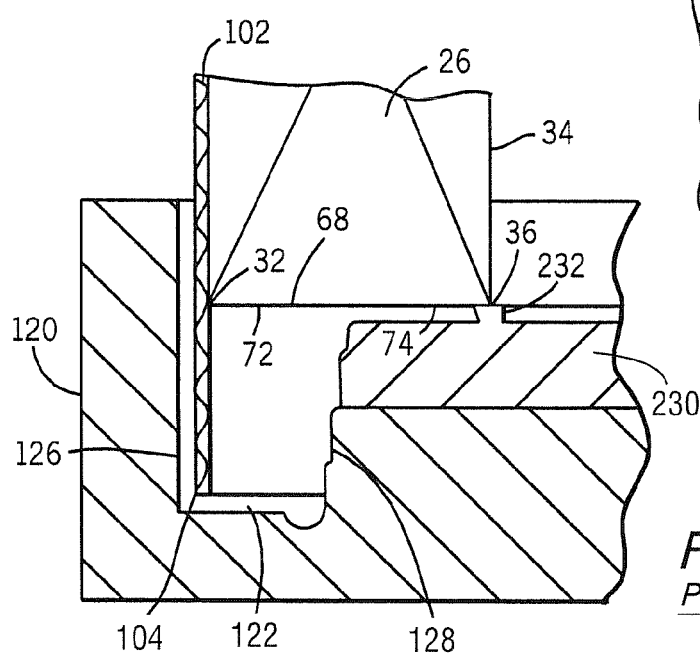

FIG. 10 shows a mold 120 for molding or potting end cap 200 onto pleated filter media 26 of the filter element. The mold has a trough 122 as above. The mold has an insert 230 similar to insert 124 but with upstanding darn 232 at inner pleat tips 36 at inner perimeter 34.

Figure 11:
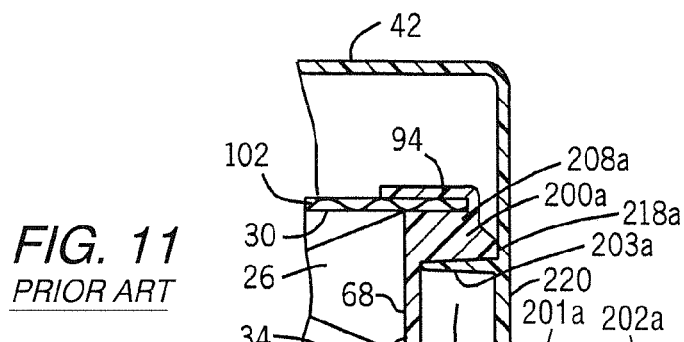

FIG. 11 shows an alternate embodiment wherein outlet flow tube 202*a* has an outer section 201*a* of reduced diameter to accommodate engine compartment size and location requirements, yet maintaining an increased inner diameter section 203*a*, as in FIG. 6. The spacing of axial end wall 220 of the housing from axial ends 68 of the filter media pleats provides the noted plenum 130. End cap 200*a* has the noted first and second sections 208*a* and 210*a*. End cap 200*a* covers the inner and outer pleat tips 36 and 32 and spans radially between the inner and outer perimeters 34 and 30. The end cap provides the noted triple sealing at axial seals 218*a* and 224*a* and at radial seal 222*a*.

As shown in comparing FIGS. 3, 4, 8, 9, the present construction seals the axial ends 68 of the pleats solely with urethane end cap 200, or 200*a*, and eliminates reliance upon hot melt 110 for sealing purposes. This eliminates the adhesive component in the design of FIGS. 3, 4, and simplifies the production process, reducing cost. In the present construction of FIGS. 8, 9, the axial ends 68 of the pleats 28 are sealed with the same urethane 200, or 200*a*, used to pot the element, rather than a combination of hot melt 110 and urethane 66 as in FIGS. 3, 4. The present construction also eliminates reliance upon the interface between the glue 110, the filter media of the pleats 28, and the urethane 66 to prevent contaminants from passing to the clean side of the filter. The present construction further facilitates concentricity of the closed loop configuration. The present construction further enhances structural integrity, particularly in wet conditions, heavy load conditions, and vibration conditions.

Figure 12:
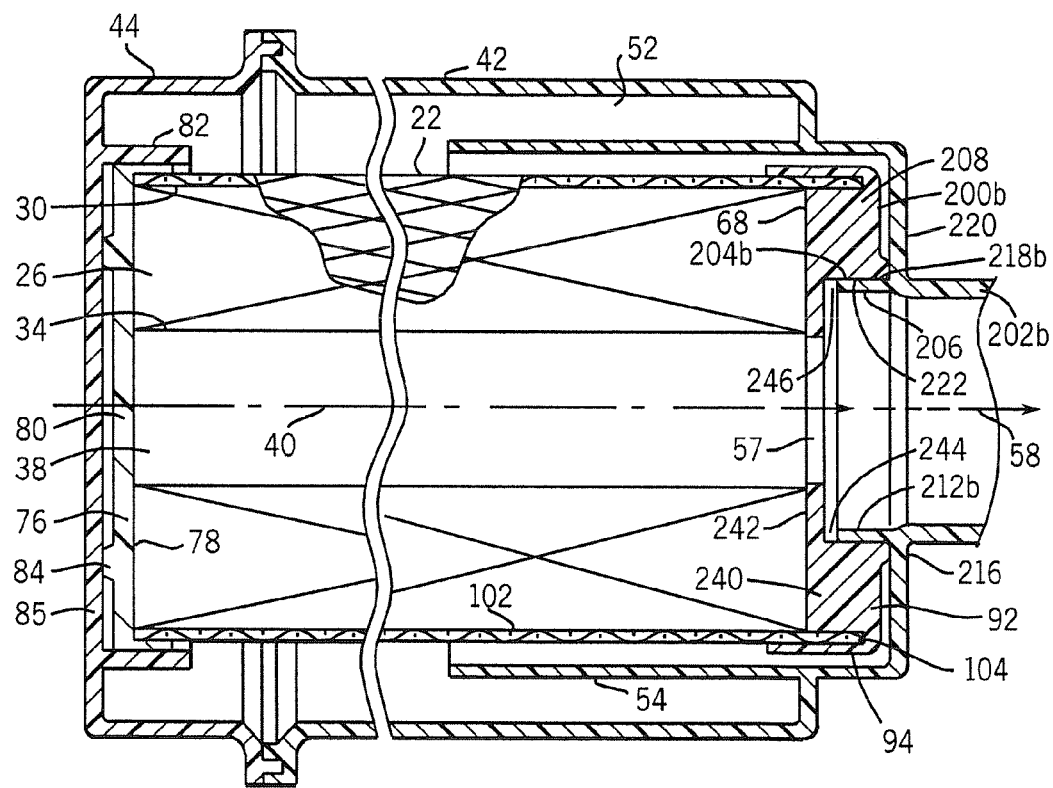

FIG. 12 shows a further embodiment and uses like reference numerals from above where appropriate to facilitate understanding. End cap 200*b* has first section 240 extending radially inwardly from the outer perimeter 30 defined by outer pleat tips 32, and has a second section 242 extending radially inwardly from first section 240. First and second sections 240 and 242 meet at a junction defining a step 204*b*. Flow tube 202*b* communicates with hollow interior 38 and extends along axial flow passage 57. Flow tube 202*b* has an inner tubular portion 212*b* extending along step 204*b* and radially engaging the step to form a radial seal 222 therewith. Flow tube 202*b* has the noted flange portion 216 extending radially outwardly from tubular portion 212*b* and axially spaced from first axial end 68 of the filter element by first section 240 of end cap 200*b* therebetween. Flange portion 216 engages first section 240 of end cap 200*b* at engagement point 218*b* to form an axial seal therewith. Tubular portion 212*b* has an inner axial end 244 axially facing first end 68 of the filter element. Second section 242 of end cap 200*b* is axially between inner axial end 244 of tubular portion 212*b* and first axial end 68 of the filter element. Second section 242 of end cap 200*b* extends radially inwardly from first section 240 of the end cap all the way to inner perimeter 34 defined by inner pleat tips 36. End cap 200b covers inner and outer pleat tips 36 and 32 and spans radially between inner and outer perimeters 34 and 30. Inner axial end 244 of tubular portion 212b is axially spaced from second section 242 of end cap 200b by an axial gap 246 therebetween. This may be desired in some applications to protect against excessive axial compression or axial crushing. For example, it may be desired to protect the pleat ends at 68 from the line of axial force otherwise provided by the annulus at inner end 244 of the flow tube, with or without adhesive or hot melt 110 between the pleats.

Figure 13:
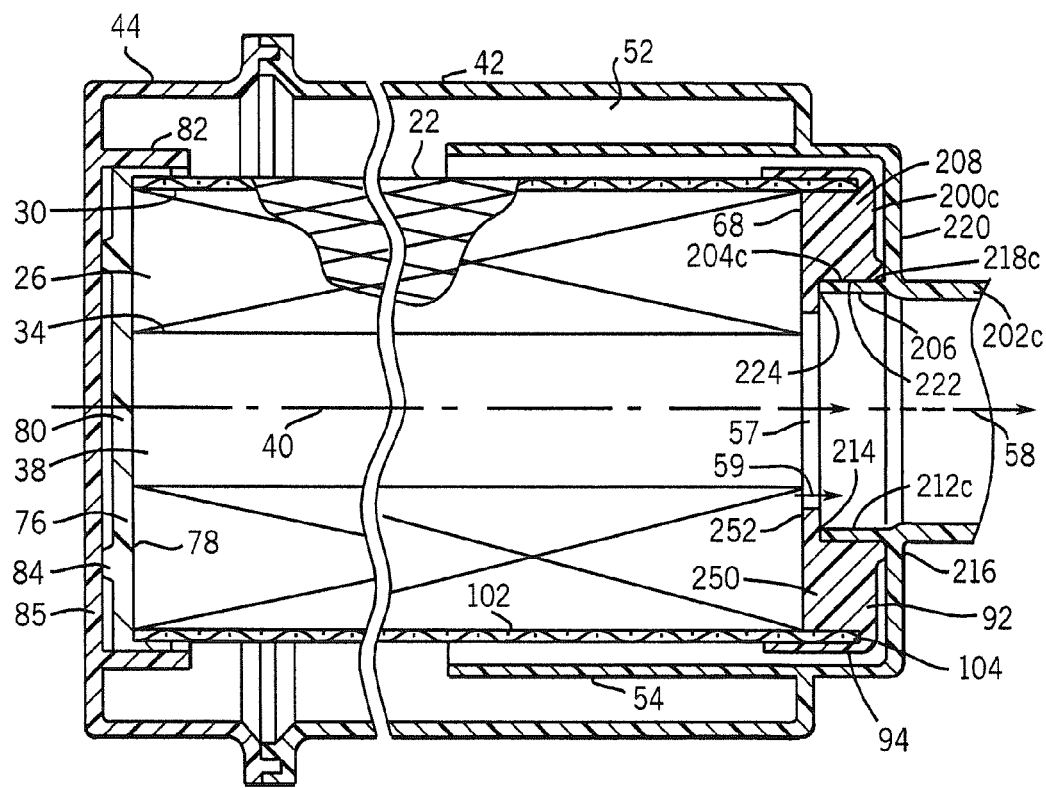

FIG. 13 shows a further embodiment and uses like reference numerals from above where appropriate to facilitate understanding. End cap 200c has a first section 250 extending radially inwardly from the outer perimeter 30 defined by outer pleat tips 32, and has a second section 252 extending radially inwardly from first section 250. First and second sections 250 and 252 meet at a junction defining a step 204c. Flow tube 202c communicates with hollow interior 38 and extends along axial flow passage 57. Flow tube 202c has a tubular portion 212c extending axially along step 204c and radially engaging the step to form a radial seal therewith. Flow tube 202c has flange portion 216 extending radially outwardly from tubular portion 212c and axially spaced from first axial end 68 of the filter element by the first section 250 of end cap 200c therebetween. Flange portion 216 axially engages first section 250 of end cap 200c at engagement point 218c to form an axial seal therewith. Tubular portion 212c has inner axial end 214 axially facing first end 68 of the filter element. Second section 252 of end cap 200c is axially between inner axial end 214 of tubular portion 212c and first end 68 of the filter element. Second section 252 of end cap 200c extends radially inwardly from first section 250 only partially towards inner perimeter 34 defined by inner pleat tips 36 and does not cover inner pleat tips 36. This embodiment may be desirable in instances where the additional migration or flow at 59 is desired. This embodiment may also be desirable where additional flow of potting material into the pleat ends and between the wall segments of the pleats is desired. For example, the wider the radial extent of the end cap along axial end 68 of the filter element, the greater the axially leftward migration of the molten potting material into and between the pleats. This may be desirable for enhanced sealing including greater interface area with the adhesive or hot melt 110 between the pleats. Inner axial end 214 of tubular portion 212c may axially engage second section 252 of end cap 200c as shown in FIG. 13 to form a second axial seal 224 therewith as in FIG. 7. Alternatively, inner axial end 214 may be spaced axially rightwardly of second section 252 of the end cap by an axial gap therebetween as at axial gap 246 in FIG. 12.

Figure 14:
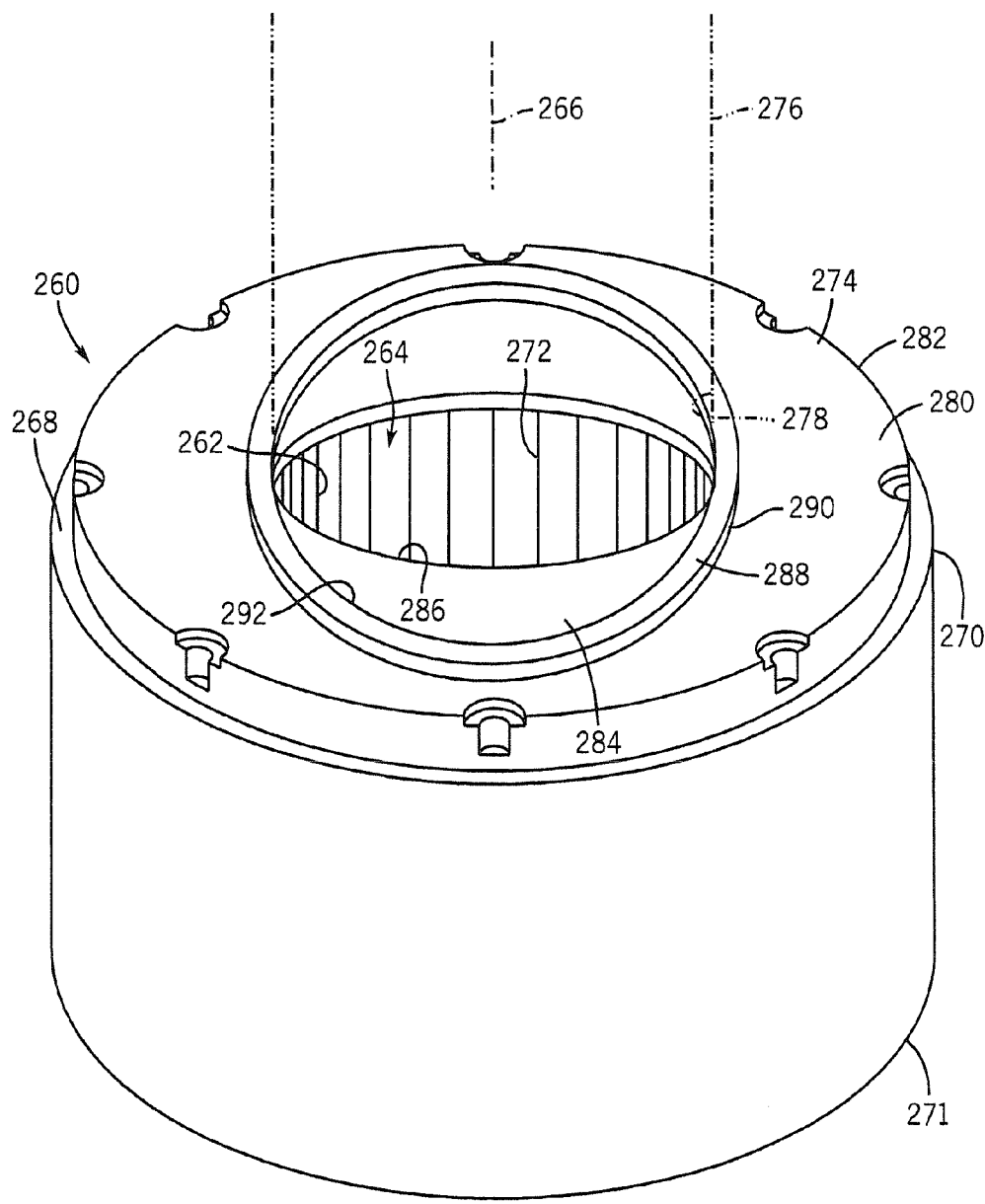

FIG. 14 shows a further embodiment including a filter element 260 including a closed loop filter media member 262 having a hollow interior 264 extending along a given axis 266, and which may also include an outer prefilter member 268 such as open cell foam. Fluid flows axially in hollow interior 264. The filter element has first and second axial ends 270 and 271. First axial end 270 is open and provides an axial flow passage 272 therethrough along axis 266 communicating with hollow interior 264. A resiliently compressible end cap 274 is provided at first axial end 270. A flow tube as shown in dashed line at 276 and which is comparable to flow tube 202, communicates with hollow interior 264 and extends along axial flow passage 272. Flow tube 276 has a tubular portion 278, comparable to tubular portion 212, engaging end cap 274 and forming a seal therewith, comparable to seal 218 and/or 222 and/or 224. Tubular portion 278 is cylindrical. Filter media member 262 is non-cylindrical. In one embodiment, the filter media member is elliptical, such as oval, racetrack shaped, or the like. End cap 274 has a first section 280 extending radially inwardly from an outer perimeter 282, and has second section 284 extending radially inwardly from first section 280 to an inner perimeter 286. First and second sections 280 and 284 are comparable to first and second sections 240 and 242 and to first and second sections 250 and 252. First and second sections 280 and 284 meet at a junction defining a step 288, comparable to steps 204, 204b, 204c. First section 280 has the noted outer perimeter 282, and has an inner perimeter 290 at step 288. Second section 284 has an outer perimeter 292 at step 288, and has the noted inner perimeter 286 communicating with hollow interior 264. Outer perimeter 282 of first section 280 is non-cylindrical. Inner perimeter 290 of first section 280 is cylindrical. Step 288 is cylindrical. Outer perimeter 292 of second section 284 is cylindrical. Cylindrical tubular portion 278 engages end cap 274 at cylindrical step 288, comparable to the above noted engagement of cylindrical portions 212, 212b, 212c with steps 204, 204b, 204c. Inner perimeter 286 of second section 284 is non-cylindrical. Filter media member 262 and outer perimeter 282 of first section 280 of end cap 274 are elliptical and have a radially extending major axis (left-right in FIG. 14), and a radially extending minor axis (up/down in FIG. 14). The radial extension of first section 280 of end cap 274 along the major axis between outer perimeter 282 of first section 280 of end cap 274 and step 290 is greater than the radial extension of first section 280 of end cap 274 along the minor axis between outer perimeter 282 of first section 280 of end cap 274 and step 288. The radial extension of second section 284 of end cap 274 along the minor axis between step 288 and inner perimeter 286 of second section 284 of end cap 274 is greater than the radial extension of the second section 284 of end cap 274 along the major axis between step 288 and inner perimeter 286 of second section 284 of end cap 274. In the embodiment shown, filter media member 262 is provided by pleated filter media having a plurality of pleats as above in a closed loop having an outer perimeter defined by a plurality of outer pleat tips, comparable to pleat tips 32, and an inner perimeter defined by a plurality of inner pleat tips, comparable to pleat tips 36, the loop having the noted hollow interior 264 extending along the noted given axis 266. Other types of filter media may be used, including non-pleated media. The disclosed elliptical filter design may be used in implementations where it is desired to have an elliptical filter and to maximize the inlet or outlet diameter of the filter or match specifications requiring cylindrical inlet or outlet flow tubes.

Present Invention

FIGS. 15-31 use like reference numerals from above where appropriate to facilitate understanding.

FIG. 15 shows filter element 22 of FIGS. 1, 2, modified, to be described, for filtering fluid, including annular filter media 26 having a hollow interior 38, FIGS. 2, 15, and extending axially along axis 40 between first and second axial ends 62, 64, the first axial end 62 being open and defining an axial flow path 57, FIG. 7, therethrough communicating with hollow interior 38, the fluid flowing axially as shown at 58 along the axial flow path 57 through open axial end 62. A reinforcement ring 302, FIG. 15, is provided at at least one of the noted axial ends, e.g. at open axial end 62, and performs a support function thereat upon attempted percussive cleaning of filter element 22 by service personnel striking the axial end against an impact surface, for example as schematically shown at 304. Annular filter media 26 has an outer circumference 30 and an inner circumference 34 and extends radially therebetween. As used herein, annular includes circular, elliptical, oval, racetrack-shaped, and other closed-loop shapes. First axial end 62 has an axially facing end face 68 extending radially between inner and outer circumferences 34 and 30. Reinforcement ring 302 is at at least one of outer circumference 30, end face 68, and inner circumference 34, to be described. In various embodiments, to be described, the reinforcement ring is an annular member at the outer circumference and/or at the end face and/or at the inner circumference and/or at the junction of the end face and the outer circumference and/or at the junction of the end face and the inner circumference. The reinforcement ring may have various cross-sectional shapes such as rectangular or square as shown at 302 in FIG. 15, round as shown at 306 in FIG. 16, as well as other cross-sectional shapes.

End cap 200, FIG. 15, may extend at section 210 radially inwardly all the way to inner circumference 34, as in FIGS. 7, 11, 12, or may stop short thereof as in FIGS. 2, 6, 13 at end cap 66. The end cap is a molded member, as described above, and encapsulates the junction of end face 68 and outer circumference 30 and extends radially inwardly along end face 68 at least partially towards inner circumference 34. Reinforcement ring 302 is encapsulated in end cap 200. In one embodiment, the reinforcement ring, or at least a portion thereof, is at end face 68 and spaced radially outwardly of inner circumference 34.

In FIG. 17, reinforcement ring 306 is an L-shaped member having a first leg 308 along outer circumference 30 and a second leg 310 extending radially inwardly, which leg 310 may extend all the way to inner circumference 34 as shown in FIG. 17, or may stop short thereof. Leg 310 may be perforated as shown at perforations 312 in FIG. 18, which may be desirable in those embodiments where the end cap does not extend radially inwardly all the way to or past inner circumference 34, which embodiments provide the noted additional flow at 59, FIGS. 2, 6, 13.

Filter element 22 may have an outer liner, for example as shown at 102 in FIGS. 2, 7, 11-13, which outer liner 102 extends axially along outer circumference 30 and may extend beyond end face 68 as shown at 104. In FIG. 19, outer liner 102 has a reinforcement segment 314 turned radially away from outer circumference 30 and providing the noted reinforcement ring. Reinforcement segment 314 is turned radially inwardly toward inner circumference 34. In FIG. 19, the reinforcement segment 314 is curled in a spiral as shown at 316. In FIG. 20, reinforcement segment 318 is turned radially inwardly toward inner circumference 34 and has a turn-back portion 320 turned back axially toward end face 68. In FIG. 21, reinforcement segment 322 extends from a turn 324 at outer circumference 30 and extends radially inwardly to a termination end 326 pointing toward inner circumference 34. In an alternative, reinforcement segment 322 may extend radially inwardly all the way to inner circumference 34 as shown in FIG. 17, preferably with end cap encapsulation thereof. In FIGS. 21 and 17, the reinforcement segment in one embodiment extends from a substantially 90° turn 324 at outer circumference 30 then substantially rectilinearly to termination end 326. The reinforcement segment may be permeable as shown at 312 in FIG. 18. In FIG. 22, the reinforcement ring 330 includes an outer axial segment 332 along outer circumference 30, a radial segment 334 extending radially inwardly from outer circumference 30 to inner circumference 34, and an inner axial segment 336 extending axially along inner circumference 34. Reinforcement ring 330 may be a separate member or may be an extension of outer liner 102. In a further embodiment, reinforcement ring 330 may be an extension of inner liner 338. In a further embodiment, reinforcement ring 330 at radial extension segment 334, whether provided by a separate member or by an extension of outer liner 102 or by an extension of inner liner 338, may be perforated as shown at perforations 340, FIG. 23, which may be desirable if end cap 200 is not extended radially inwardly all the way to inner circumference 34, for example as shown at end cap 66 in FIGS. 2, 6, 13.

FIG. 24 shows a mold 342 for molding or potting end cap 200, or end cap 66, FIG. 2, onto pleated filter media 26 of the filter element, comparable to mold 120, FIG. 5. End cap 200 at the noted first axial end 68 has an axial extension portion 344 extending axially along outer circumference 30 including outer liner 102 if provided. Reinforcement ring 346 is at axial extension portion 344 of the end cap. Axial extension portion 344 extends axially to an axial termination end 348. Reinforcement ring 346 is at termination end 348. Reinforcement ring 346 is axially spaced from end face 68 in a given axial direction away from axial end 62. The end cap provides a seal formed by molding material at first axial end 62, as above noted. Reinforcement ring 346 is a dam blocking flow of molding material therepast in the noted given axial direction.

In FIG. 25, end cap 200 has an axial extension portion 352 extending axially along outer circumference 30 including outer liner 102 if provided, and has a radial extension portion 354 extending radially inwardly along end face 68. Reinforcement ring 356 is provided along the exterior of end cap 200. Reinforcement ring 356 has an axial segment 358 extending axially along the exterior of axial extension portion 352 of the end cap and spaced radially outwardly of outer circumference 30 by the axial extension 352 of the end cap therebetween. Reinforcement ring 356 has a radial segment 360 extending radially along the exterior of radial extension portion 354 of the end cap and spaced axially outwardly of end face 68 by radial extension portion 354 of the end cap therebetween.

In FIGS. 26, 27, the reinforcement ring is an annular ring member 362 having a plurality of spokes 364 extending radially inwardly therefrom to a central hub 366 axially aligned with hollow interior 38. The spokes at least partially cross end face 68. FIG. 27 shows a housing section 368 comparable to housing section 42, FIGS. 1, 2, having an inlet 370 comparable to inlet 50, and having an outlet 372 comparable to outlet 90.

In FIGS. 28, 29, reinforcement ring 374 is provided by concentric first and second ring members 376 and 378 at end face 68 and a structural support web comprising a plurality of truncated spokes 380 extending radially between the first and second ring members. Second ring member 378 is at outer circumference 30, and first ring member 376 is spaced radially inwardly thereof. In the embodiment of FIGS. 28, 29 first ring member 376 is at inner circumference 34, and reinforcement ring 374 includes a third ring member 382 radially intermediate first and second ring members 376 and 378. Third ring member 382 has an axial extension 384 extending axially away from end face 68 and axially beyond first and second ring members 376 and 378. In one embodiment, end cap 66 encapsulates second and third ring members 382 and 378 and the junction of outer circumference 30 and end face 68. Further in such embodiment, end cap 66 does not encapsulate first ring member 376, and fluid flows axially along axis 40 between structural support web truncated spokes 380 at a location along end face 68 between first ring member 376 and end cap 66 as shown at arrow 59, which additional flow is also shown at 59 in FIGS. 2, 6, 13.

In FIGS. 30, 31, the reinforcement ring is replaced by a failure ring 386 at the noted open axial end 62. Failure ring 386 performs a designated failure function to a failure condition at the open axial end upon attempted percussive cleaning of filter element 22 by service personnel striking open axial end 62 against an impact surface 304, with the failure condition providing at least one of: a) an indication to service personnel that filter element 22 has been damaged and should not be re-installed; and b) a deformed condition preventing re-installation. Failure ring 386 is at at least one of outer circumference 30, end face 68 and inner circumference 34. In one embodiment, the failure condition is selected from the group consisting of fracture, tearing, failure, protruding, re-assembly prevention, and change in shape. In the embodiment of FIGS. 30, 31, failure ring 386 is an annular fracture disk 388 at end face 68 and spanning from outer circumference 30 at least partially radially inwardly toward inner circumference 34 and having a plurality of tapered radial slots 390, FIG. 31, tapering to wider widths as the slot extends radially inwardly toward inner circumference 34. In another embodiment, the noted indication is selected from the group consisting of a color change, a texture change, a smell change, and a chemical release causing a change in a material physical characteristic. In one form of such embodiment, the failure ring includes microcapsules in the molded end cap at the noted open axial end, which microcapsules when ruptured produce one of the noted changes. In one desirable embodiment, the microcapsules rupture to provide a color change from green to red, wherein green indicates good, and red indicates bad or damaged. The fracture indicator may be potted into or adhered to the outside of a urethane end cap. The indicator can be made of a very thin pouch with printing on the surface, and would contain a clear viewing window, which would show the green colored microbeads inside. When the axial end of the filter element at the end cap is hit with an impact force above a designated level, the microbeads would rupture or pop and bleed into the entire viewing area, revealing a red color. This would show the customer that the pleat tip seals of the element may be comprised. The indicator label may have printed instructions telling a customer: do not clean; and red panel means discard the element. The label and indicator would also help customers identify that they are using an original equipment manufacturer product and differentiate same from unauthorized replacement elements. In another example, the failure ring may be provided by a pressure sensitive film containing the microcapsules. For example, a pressure sensitive film produced by Fuji under the trademark PRESSUREX is a Mylar based film that contains a layer of microcapsules. The application of force upon the film causes the microcapsules to rupture, producing an instantaneous and permanent high resolution topographical image of pressure variation across the contact area. The pressure indicating sensor film may be placed between any two surfaces that touch, mate or impact. Pressure can be applied and the film then removed, whereupon the film reveals the pressure distribution profile that occurred between the two surfaces. This is conceptually similar to litmus paper, with the color intensity of the noted pressure indicating sensor film directly related to the amount of pressure applied to it. The greater the pressure, the more intense the color.

In the above embodiments, the reinforcement ring is at the open first axial end 62 of the annular filter element. In a further embodiment, a reinforcement ring 392, FIG. 32, may be provided at the noted second axial end 64. In further embodiments, two axially distally opposite reinforcement rings 302, 392 are provided, as shown in FIG. 32. One or both of the rings 302, 392 may include or be replaced by a failure ring, which in one embodiment includes the noted microcapsules in a respective molded end cap 66, 76 at the respective axial end 62, 64, which microcapsules when ruptured produce the noted change. The failure ring may include an indication, such as shown at failure ring strip 394 in FIG. 33, such as "do not clean", "red panel=discard element", and so on.

The above embodiments show an annular filter element. In another embodiment, the filter element is a panel filter element such as shown at 396 in FIG. 34. The panel filter element includes filter media 398 having a perimeter or border 400 which may include a frame and/or seal for mounting in a housing. A reinforcement band 402 is provided along at least a portion of the perimeter and performs the noted support function thereat upon attempted percussive cleaning of filter element 396 by service personnel striking perimeter 400 against an impact surface such as 304, FIG. 15. Panel filter element 396 is generally flat and may have various perimeteral border shapes, including rectangular. The noted reinforcement band at 402 may include or be replaced by a failure band 404 along at least a portion of perimeter 400 and performing the noted designated failure function to the noted failure condition thereat upon attempted percussive cleaning of filter element 396 by service personnel striking perimeter 400 against an impact surface, e.g. at 304, the failure condition providing at least one of: a) an indication to service personnel that the filter element has been damaged and should not be re-installed; and b) a deformed condition preventing re-installation. Indicia may be provided on failure band 404, for example comparably to indicia band 394, FIG. 33.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A filter element for filtering fluid, comprising annular filter media having an outer circumference, and an inner circumference defining a hollow interior, and extending axially between first and second axial ends, said first axial end having an axially facing end face extending radially between inner and outer circumferences, and an end cap at said first axial end and extending axially away from said end face in a first axial direction, said second axial end being axially spaced from said first axial end along a second axial direction, said first axial direction being opposite to said second axial direction, an annular outer liner extending axially along said outer circumference and extending in said first axial direction beyond said end face and into said end cap and providing a percussion band performing a support function upon attempted percussive cleaning of said filter element by service personnel striking said first axial end at said outer circumference against an impact surface, wherein said outer liner extending into said end cap has a reinforcement segment turned away from said outer circumference and radially inwardly toward said inner circumference and providing said percussion hand, wherein said reinforcement segment is curled in a spiral.

* * * * *

UNITED STATES PATENT AND TRADEMARK OFFICE
CERTIFICATE OF CORRECTION

PATENT NO. : 8,460,415 B1  
APPLICATION NO. : 13/743744  
DATED : June 11, 2013  
INVENTOR(S) : Heckel et al.

Page 1 of 1

It is certified that error appears in the above-identified patent and that said Letters Patent is hereby corrected as shown below:

On the Title page, item [71], delete "Barry M. Verdegan, Stoughton, WI (US)".

On the Title page, item [71], add "Cummins Filtration IP Inc., Minneapolis, MN (US)".

Signed and Sealed this  
Fourth Day of March, 2014

Michelle K. Lee  
*Deputy Director of the United States Patent and Trademark Office*